United States Patent
Park et al.

(10) Patent No.: US 10,021,763 B2
(45) Date of Patent: Jul. 10, 2018

(54) BEZEL-FREE DISPLAY DEVICE FORMED BY USING FLEXIBLE WIRES AND MANUFACTURING METHOD THEREFOR

(71) Applicant: UNIST ACADEMY-INDUSTRY RESEARCH CORPORATION, Ulsan (KR)

(72) Inventors: Jang-Ung Park, Ulsan (KR); Mi Jung Kim, Gyeonggi-do (KR); Ji Hun Park, Gyeongsangnam-do (KR); Kyoung Hee Pyo, Ulsan (KR); Sung Won Kim, Gyeonggi-do (KR); Byeong Wan An, Gyeonggi-do (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 274 days.

(21) Appl. No.: 14/759,656

(22) PCT Filed: Dec. 12, 2013

(86) PCT No.: PCT/KR2013/011518
§ 371 (c)(1),
(2) Date: Jul. 8, 2015

(87) PCT Pub. No.: WO2015/041388
PCT Pub. Date: Mar. 26, 2015

(65) Prior Publication Data
US 2015/0359065 A1    Dec. 10, 2015

(30) Foreign Application Priority Data
Sep. 17, 2013    (KR) ........................ 10-2013-0111564

(51) Int. Cl.
*H05B 33/26*    (2006.01)
*H05B 33/06*    (2006.01)
(Continued)

(52) U.S. Cl.
CPC ........... *H05B 33/26* (2013.01); *G02F 1/1345* (2013.01); *G02F 1/133305* (2013.01);
(Continued)

(58) Field of Classification Search
CPC ........................ G02F 1/133305; G02F 1/1345
See application file for complete search history.

(56) References Cited

U.S. PATENT DOCUMENTS 9,207,477 B2 *    12/2015    Miyazaki ............ G02F 1/13452
9,756,733 B2 *    9/2017    Drzaic ................. H05K 1/189
(Continued)

FOREIGN PATENT DOCUMENTS

JP    2008-084968 A    4/2008
KR    10-2012-0068380 A    6/2012
(Continued)

OTHER PUBLICATIONS

International Search Report for PCT/KR2013/011518 dated Jun. 9, 2014 from Korean Intellectual Property Office.

*Primary Examiner* — Nimeshkumar Patel
*Assistant Examiner* — Jacob R Stern
(74) *Attorney, Agent, or Firm* — Revolution IP, PLLC

(57) ABSTRACT

Provide is a bezel-free display device comprising: a flexible substrate comprising an element area including an electronic element and positioned on the upper surface thereof, a terminal area including a terminal electrically connected to the electronic element, and positioned at the rear surface thereof, and a flexible area positioned between the element area and the terminal area and having flexibility; a flexible wire positioned on the flexible area of the flexible substrate, electrically connecting the element and the terminal, and having flexibility; and a display member positioned on the element area of the flexible substrate and electrically connected with the electronic element.

17 Claims, 30 Drawing Sheets

(51) Int. Cl.
*H05B 33/14* (2006.01)
*H05B 33/10* (2006.01)
*G02F 1/1333* (2006.01)
*G02F 1/1345* (2006.01)
*H05B 33/28* (2006.01)
*B82Y 20/00* (2011.01)
*B82Y 40/00* (2011.01)

(52) U.S. Cl.
CPC ............ *H05B 33/06* (2013.01); *H05B 33/10* (2013.01); *H05B 33/145* (2013.01); *H05B 33/28* (2013.01); *B82Y 20/00* (2013.01); *B82Y 40/00* (2013.01); *Y10S 977/892* (2013.01); *Y10S 977/952* (2013.01)

(56) References Cited

U.S. PATENT DOCUMENTS

| | | | |
|---|---|---|---|
| 2007/0222909 A1 | 9/2007 | Slikkerveer et al. | |
| 2007/0229475 A1* | 10/2007 | Gettemy | G06F 1/1626 |
| | | | 345/173 |
| 2012/0153814 A1 | 6/2012 | Lee et al. | |

FOREIGN PATENT DOCUMENTS

| | | |
|---|---|---|
| KR | 10-2012-0078639 A | 7/2012 |
| KR | 10-2012-0092431 A | 8/2012 |
| KR | 10-1303988 B1 | 9/2013 |

* cited by examiner

BEZEL-FREE DISPLAY DEVICE FORMED BY USING FLEXIBLE WIRES AND MANUFACTURING METHOD THEREFOR

CROSS REFERENCE TO PRIOR APPLICATIONS

This application is a National Stage Application of PCT International Patent Application No. PCT/KR2013/011518 filed on Dec. 12, 2013, under 35 U.S.C. § 371,which claims priority to Korean Patent Application No. 10-2013-0111564 filed on Sep. 17, 2013, which are all hereby incorporated by reference in their entirety.

TECHNICAL FIELD

The present invention relates to a display device, and more particularly, to a bezel-free display device that removes a bezel area by using flexible wires and a manufacturing method therefor.

BACKGROUND ART

Light-emitting diodes or touch screens apply electric signals by using transparent electrodes. In general, indium tin oxide (ITO) is widely used as the transparent electrodes. However, ITO has a high sheet resistance and a high material cost. Also, there is a limitation that indium supply and demand is unstable in raw material markets. Recently, research into a transparent electrode material for replacing ITO has been carried out. For example, technology for implementing transparent electrodes by using graphene has been suggested. However, graphene also has a limitation of a high sheet resistance. Thus, the development of the transparent electrode material having a low sheet resistance and high light transmittance is required. Also, as flexible electronic devices have emerged, transparent electrodes simultaneously having flexibility and elasticity while maintaining light transmittance are needed.

In electronic devices, such as mobile phones, the size of a screen is gradually increased to increase readability. However, an increase in the size of the screen lowers portability, and in particular, it may be difficult for a man to grip an electronic device with one hand. In this way, in order to simultaneously meet the requirements for a wide screen and portability, demand for removing bezel of a display from a front surface of the display or minimizing bezel of the display is increasing. Related technology includes Korean Unexamined Patent Application Publication No. 10-2012-0092431.

DETAILED DESCRIPTION OF THE INVENTION

Technical Problem

The present invention provides a bezel-free display device that removes a bezel area by forming a terminal at a rear surface of the bezel-free display device to simultaneously meet the requirements for both a wide screen and portability and to increase a continuous expandability of a display screen.

The present invention also provides a method of manufacturing a bezel-free display device that removes a bezel area by forming a terminal at a rear surface of the bezel-free display device to simultaneously meet the requirements for both a wide screen and portability and to increase a continuous expandability of a display screen.

Technical Solution

According to an aspect of the present invention, there is provided a bezel-free display device including: a flexible substrate including an element area including an electronic element and positioned on the upper surface thereof, a terminal area including a terminal electrically connected to the electronic element, and positioned at the rear surface thereof, and a flexible area positioned between the element area and the terminal area and having flexibility; a flexible wire positioned on the flexible area of the flexible substrate, electrically connecting the element and the terminal, and having flexibility; and a display member positioned on the element area of the flexible substrate and electrically connected with the electronic element.

According to another aspect of the present invention, there is provided a bezel-free display device including: a substrate including a first area, a second area reversely positioned in the first area, and a third area positioned between the first area and the second area and having flexibility; a first wire mounted on the first area; a second wire mounted on the second area; and a flexible wire that is positioned on the third area, electrically connects the first wire and the second wire and has flexibility.

According to still another aspect of the present invention, there is provided a method of manufacturing a bezel-free display device, the method including: forming a flexible substrate including an element area, a terminal area, and a flexible area positioned between the element area and the terminal area and having flexibility; forming an electronic element and an element area wire in the element area and forming a terminal area wire and a terminal in the terminal area; forming a flexible wire that electrically connects the terminal area wire and has flexibility; forming a rear-surface terminal in such a way that the terminal area is positioned on a rear surface of the element area by folding the flexible area; and mounting a display member on the element area by electrically connecting the display member to the electronic element.

According to yet still another aspect of the present invention, there is provided a bezel-free display device including: a flexible substrate including an element area, which is formed of a material having rigidity and in which a display member is disposed, a terminal area in which a terminal is disposed and which is formed of a material having rigidity, and a flexible area positioned between the element area and the terminal area and having flexibility; and a flexible wire that is positioned on the flexible area of the flexible substrate, electrically connects the display member and the terminal and has flexibility.

Advantageous Effects

In a bezel-free display device according to the technical idea of the present invention, a bezel area is formed at a rear surface of the bezel-free display device by using flexible wires so that bezel of a display can be removed. Thus, when an expanded screen is implemented by displays, dividing of a screen can be minimized. Thus, a larger screen can be continuously reproduced.

Also, the flexible wire is formed to include a plurality of hybrid wire structures including a graphene layer and nanowires that contact the graphene layer and are configured of a network so that the effect of high light transmittance, high flexibility and a low sheet resistance can be provided.

Thus, the bezel-free display device according to the technical idea of the present invention can provide the effect of simultaneously meeting the requirements for both a wide screen and portability, and in particular, increasing a continuous expandability of a display screen by removing bezel of a display.

In addition, when a large screen is implemented, a comparable effect to a case where a large display device is used, can be attained by using a display device having a relatively small size in place of a large display device that is economically infeasible and uncomfortable handling.

MODE OF THE INVENTION

Figure 1:
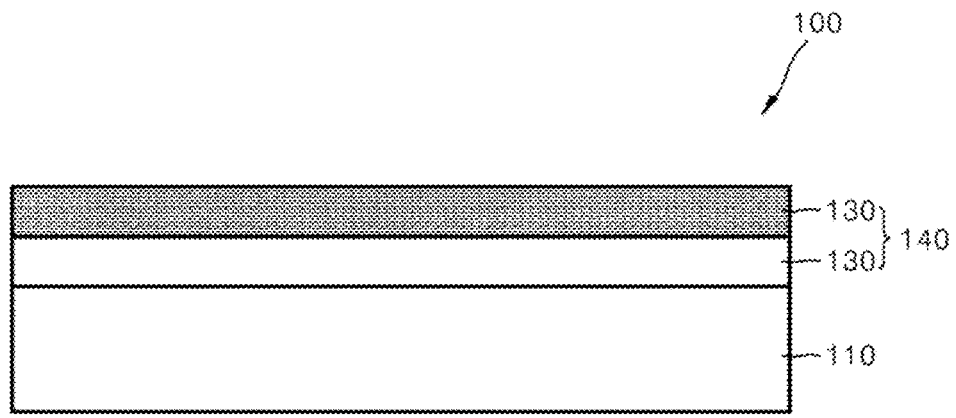
FIG. 1 is a cross-sectional view of a flexible wire according to an embodiment of the present invention.

Hereinafter, exemplary embodiments of the present invention will be described in detail with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. As used herein, the term "and/or" includes any and all combinations of one or more of the associated listed items. Like reference numerals denote like elements. Furthermore, various elements and regions in the drawings are schematically shown. Thus, the technical idea of the present invention is not limited by relative sizes or distances in the attached drawings.

The technical idea of the present invention is to provide a bezel-free display device. The bezel-free display device may include flexible wires having flexibility. Thus, a terminal is positioned at a rear surface of the bezel-free display device to reduce or remove bezel so that a continuous expandability of a display screen can be increased. The flexible wire may include a graphene layer and a nanomaterial layer. Here, the term "bezel-free" means that bezel is in a zero state and ignorably minute.

The flexible wire may include hybrid transparent electrode structures and may also have a stack structure including a plurality of hybrid transparent electrode structures. Each of the hybrid transparent electrode structures may include a two-dimensional (2D) nanomaterial layer and a one-dimensional nanomaterial layer.

The 2D nanomaterial layer may include a 2D nanomaterial or 2D nanomaterials, for example, may include carbon nanomaterials, such as graphene, graphite or CNTs. The 2D nanomaterial means that nanomaterials have a planar shape, for example, a shape of a sheet.

The one-dimensional nanomaterial layer may include one-dimensional nanomaterials, for example, metal nanomaterials, such as silver nanowires. The one-dimensional nanomaterials mean that nanomaterials have a linear shape, for example, a shape of wires.

However, the shape of the 2D nanomaterial layer and the shape of the one-dimensional nanomaterial layer are examples, and the technical idea of the present invention is not limited thereto.

Hereinafter, the technical idea of the present invention will be described by describing the graphene layer that designates the 2D nanomaterial layer exemplarily and describing the nanomaterial layer that designates the one-dimensional nanomaterial layer exemplarily. In the current embodiment, the terms "first" and "second" are used to distinguish components from each other, and the present invention is not limited thereto.

In addition, a case where the flexible wire includes a conductive polymer layer having flexibility or a non-conductive polymer layer having flexibility in place of the graphene layer, is also included in the technical idea of the present invention.

Hereinafter, a flexible wire 100 having a single-layer hybrid wire structure including a single graphene layer and a single nanomaterial layer will be described. The flexible wire 100 may have flexible characteristics, furthermore, foldable characteristics. Also, the flexible wire 100 may be transparent, translucent or opaque.

FIG. 1 is a cross-sectional view of the flexible wire 100 according to an embodiment of the present invention.

Referring to FIG. 1, the flexible wire 100 includes a single graphene layer 120 positioned on a light-transmitting substrate 110 and a single nanomaterial layer 130. The single graphene layer 120 and the single nanomaterial layer 130 may constitute a single hybrid wire structure 140.

In the flexible wire 100 according to the embodiment illustrated in FIG. 1, the graphene layer 120 is positioned to be in contact with the light-transmitting substrate 110, and the nanomaterial layer 130 is positioned to be in contact with the graphene layer 120. That is, the graphene layer 120 is interposed between the light-transmitting substrate 110 and the nanomaterial layer 130.

The light-transmitting substrate 110 may include a transparent material through which light passes. Also, the light-transmitting substrate 110 may include a material through which light having a desired wavelength passes selectively.

The light-transmitting substrate 110 may include glass, quartz, silicon oxide, aluminium oxide or polymer, for example, polyethyleneterephthalate (PET). The light-transmitting substrate 110 may include a flexible material. Thus, the hybrid wire structure 140 may have flexible characteristics together with the light-transmitting substrate 110, furthermore, foldable characteristics.

The light-transmitting substrate 110 may be configured of a structure in which a semiconductor device or an optical device is previously formed. For example, the light-transmitting substrate 110 may include a light-emitting diode (LED) structure, a display structure, such as a liquid crystal display (LCD) or an organic light-emitting diode (OLED), or a touch pad structure.

However, characteristics and material of the above-described light-transmitting substrate 110 are examples, and the technical idea of the present invention is not limited thereto. Also, a case where a translucent or opaque substrate is used in place of the light-transmitting substrate 110, is included in the technical idea of the present invention. The graphene layer 120 is positioned on the light-transmitting substrate 110. The graphene layer 120 may be configured of graphene. The graphene layer 120 has a graphene film structure. It is known that the above-described graphene has a 2D carbon nanostructure, electron mobility of about 15,000 $cm^2$/Vs and excellent thermal conductivity. Thus, graphene has drawn attention as a next-generation material that replaces a silicon material that is currently used in a field effect transistor (FET). When a graphene material is used, it is easy to manufacture an element by using an existing semiconductor process technology, and in particular, large-area integration can be easily implemented.

The graphene layer 120 may be formed using various methods. For example, the graphene layer 120 may be formed by a mechanical delamination technique from a graphite crystal or an electrostatic delamination technique. Also, the graphene layer 120 may be formed by a thermal decomposition technique of silicon carbide, an extraction technique using an oxidizing agent, such as hydrazine ($NH_2NH_2$), as a solvent, or a chemical vapour deposition (CVD) technique using a reactive gas including hydrogen or carbon. The CVD technique is a representative technique for manufacturing a graphene film structure. An exemplary method of forming the graphene layer 120 is described below with reference to FIG. 6.

The graphene layer 120 has a thickness of 0.1 to 0.9 nm. When the graphene layer 120 is manufactured by the CVD technique, the graphene layer 120 is a thin layer having a thickness of 0.3 to 0.4 nm. Thus, light transmittance and flexibility of the transparent electrode 100 can be improved.

Also, the graphene layer 120 is an example, and the technical idea of the present invention is not limited thereto. A case where the graphene layer 120 is configured of graphite or CNTs, is also included in the technical idea of the present invention.

The nanomaterial layer 130 is positioned on the light-transmitting substrate 110, in detail, on the graphene layer 120. The nanomaterial layer 130 may include nanomaterials that overlap each other and form a network. A structure of the network will be described below with reference to FIGS. 2 and 3. The graphene layer 120 and the nanomaterial layer 130 may physically and/or electrically contact each other.

The nanomaterial layer 130 may have conductivity, for example, a lower sheet resistance than that of the graphene layer 120. Thus, the flexible wire 100 may have a sheet resistance in the range of about 30 to about 160Ω/□. When only graphene is used to form the flexible wire 100, the flexible wire 100 has a sheet resistance more than about 400Ω/□. Thus, the flexible wire 100 includes the nanomaterial layer 130 so that the sheet resistance of the flexible wire 100 can be reduced.

If the graphene layer 120 is manufactured by the CVD technique, a thickness of the graphene layer 120 is very small, about 0.3 to 0.4 nm so that the graphene layer 120 having a film shape closely contacts the nanomaterial layer and covers the nanomaterial layer like wrapping the nanomaterial layer.

The nanomaterial layer 130 may include a nanomaterial having various shapes. For example, the nanomaterial layer 130 may include at least one of nanowires, nanoparticles, nanorods, nanowalls, nanotubes, nanobelts, and nanorings.

Also, the nanomaterial layer 130 may include a metal nanomaterial or CNTs. The metal nanomaterial may include at least one selected from the group consisting of silver (Ag), scandium (Sc), titanium (Ti), chrome (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rodium (Rh), palladium (Pd), cadmium (Cd), hafnium (Hf), tantalum (Ta), tungsten (W), rhenium (Re), osmium (Os), iridium (Ir), platinum (Pt), gold (Au), mercury (Hg), lanthanide, actinoid, silicon (Si), germanium (Ge), tin (Sn), arsenic (As), antimony (Sb), bismuth (Bi), gallium (Ga), and indium (In). However, the shape and material of the nanomaterial used to form the nanomaterial layer 130 are examples, and the technical idea of the present invention is not limited thereto.

Figure 2:
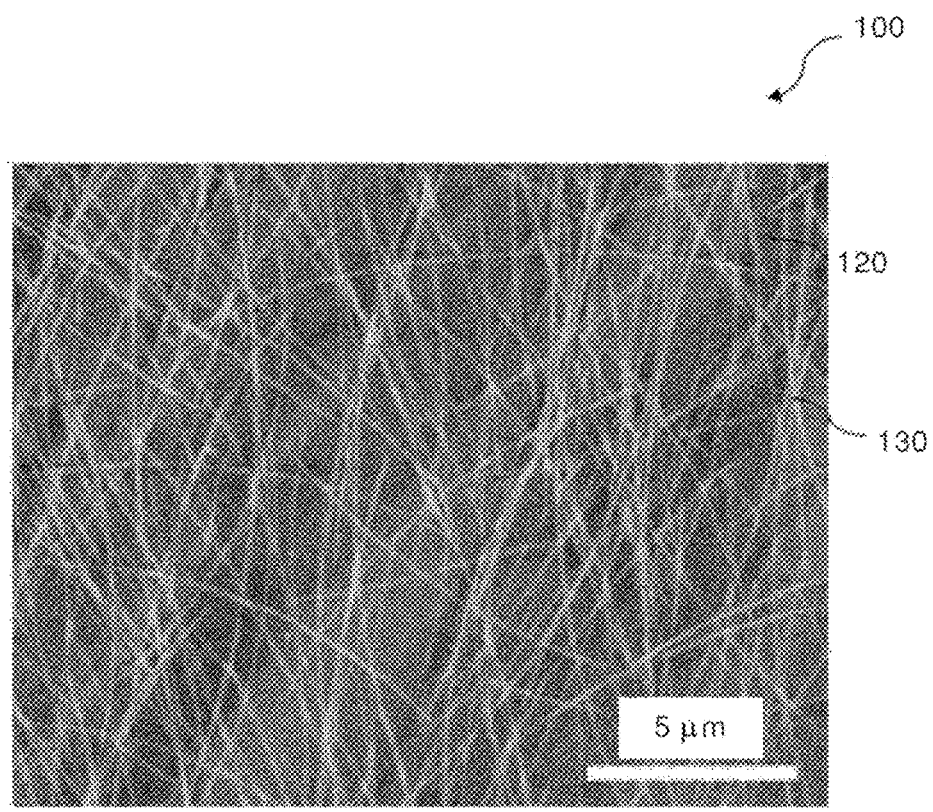
FIGS. 2 and 3 are scanning electron microscope (SEM) photos showing a nanomaterial layer included in the flexible wire of FIG. 1 according to an embodiment of the present invention.
Figure 3:
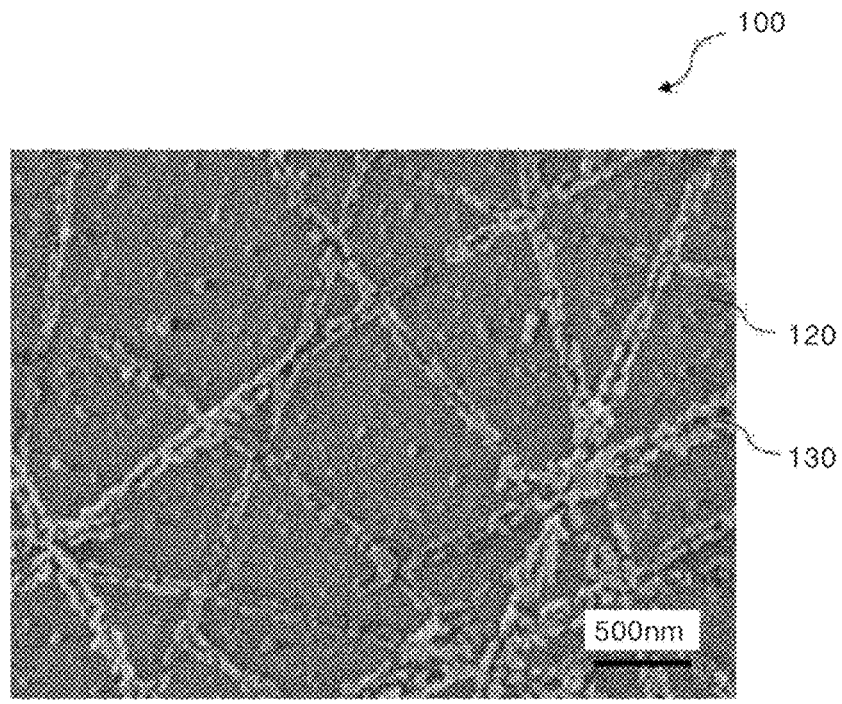

FIGS. 2 and 3 are scanning electron microscope (SEM) photos showing the nanomaterial layer 130 included in the flexible wire 100 of FIG. 1 according to an embodiment of the present invention.

Referring to FIGS. 2 and 3, the nanomaterial layer 130 includes a plurality of nanowires, and the nanowires that overlap each other and form a network are positioned on the graphene layer 120.

As the nanowires have conductivity and are positioned on the graphene layer 120 while overlapping each other and forming a network, a current that flows through the graphene layer 120 may flow through the nanowires. This will now be described in more detail.

As described above, although it is known that graphene has excellent electric conductivity and excellent light transmittance, electric conductivity of a graphene layer formed of graphene is lowered at a portion where defects occur. This defect includes a grain boundary and cracks. Thus, although many attempts to form electrodes by using graphene have been made, due to the problem at the grain boundary of graphene, a sheet resistance of graphene is increased so that it is difficult to develop a transparent electrode by using graphene. In the present invention, a network is formed when the nanowires overlap each other on a bottom surface of the graphene layer 120. When power is applied to the transparent electrode 100, the nanowires serve as a function of an electron movement path that crosses the grain boundary of graphene. Graphene has a structure in which electrons are moved into graphene and then, at the grain boundary, the electrons are moved into adjacent graphene crystals through the nanowires. This principle similarily applies to the cracks of graphene.

Also, the nanowires have low resistance than that of the graphene layer 120. As a result, a sheet resistance of the nanowires in a case where both the graphene layer 120 and the nanomaterial layer 130 are included in a conductive layer, is lower than that of the nanowires in a case where a single graphene layer 120 is used as a conductive layer.

Also, when a single nanomaterial layer 130 is used as the conductive layer without the graphene layer 120, as the nanomaterials include metal, light transmittance is lowered, whereas, when both the graphene layer 120 and the nanomaterial layer 130 are included in the conductive layer, light transmittance can be prevented from being lowered.

Figure 4:
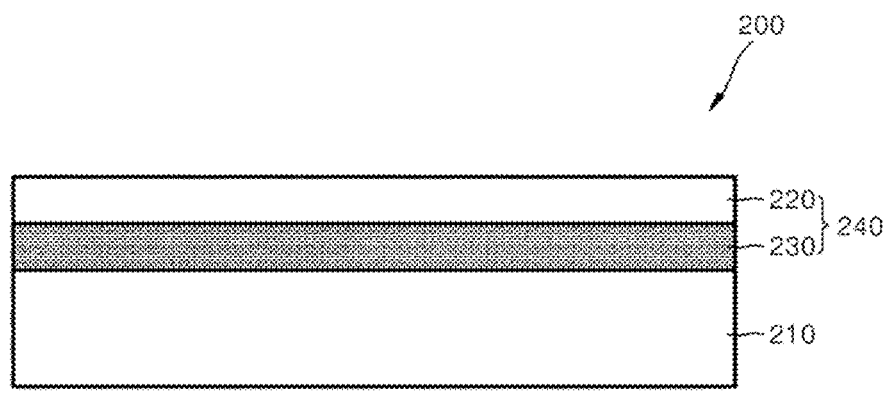
FIG. 4 is a cross-sectional view of a flexible wire according to an embodiment of the present invention.

FIG. 4 is a cross-sectional view of a flexible wire 200 according to an embodiment of the present invention. In the embodiment illustrated in FIG. 4, a part of components of the flexible wire 100 according to the embodiment illustrated in FIG. 1 is changed and thus, a redundant description thereof will be omitted.

Referring to FIG. 4, the flexible wire 200 includes a single nanomaterial layer 230 positioned on a light-transmitting substrate 210 and a single graphene layer 220. The single graphene layer 220 and the single nanomaterial layer 230 may constitute a single hybrid wire structure 240. The graphene layer 220, the nanomaterial layer 230, and the hybrid wire structure 240 of FIG. 4 may correspond to the graphene layer 120, the nanomaterial layer 130, and the hybrid wire structure 140 of FIG. 1, respectively.

In the flexible wire 200 according to the embodiment illustrated in FIG. 4, the nanomaterial layer 230 contacts the light-transmitting substrate 210 and is positioned on the light-transmitting substrate 210, and the graphene layer 200 contacts the nanomaterial layer 230 and is positioned on the nanomaterial layer 230. That is, the nanomaterial layer 230 is interposed between the light-transmitting substrate 210 and the graphene layer 220. Comparing the flexible wire 200 of FIG. 4 with the flexible wire 100 of FIG. 1, in the flexible wire 200 of FIG. 4, positions of the nanomaterial layer 230 and the graphene layer 220 are switched. That is, the hybrid wire structure 240 is positioned on the light-transmitting substrate 210 while top and bottom of the hybrid wire structure 240 are reversed.

If a nanomaterial layer is configured of nanowires formed of materials, such as silver and copper and the materials are exposed to air, the nanowires are oxidized, and electric conductivity of the nanomaterial layer is reduced. That is, the oxidized nanowires do not effectively perform a function of moving electrons across defects of graphene. If the problem is solved by increasing an amount of use of the nanowires, a problem relating to lowered light transmittance caused by the nanowires occurs again. However, in the present invention, the nanomaterial layer 230 is covered by the graphene layer having a film structure. Since the graphene layer 220 has high impermeability and thermal conductivity and the graphene layer 220 covers the nanomaterial layer 230 like wrapping the nanomaterial layer 230, the nanomaterial layer 230 is prevented from being oxidized by contact with air, and thermal stability of the nanomaterial layer 230 can be improved.

Figure 5:
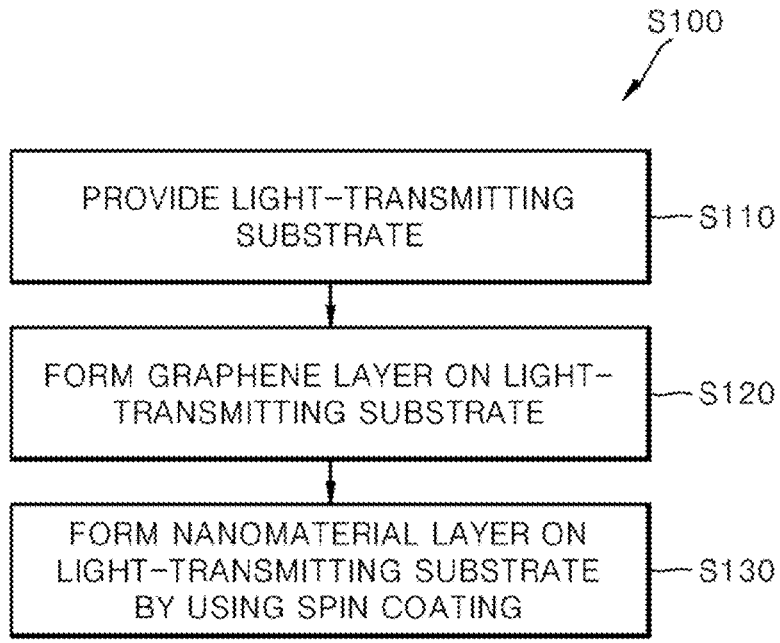
FIG. 5 is a flowchart illustrating a method of manufacturing the flexible wire of FIG. 1 according to an embodiment of the present invention.

FIG. 5 is a flowchart illustrating a method (S100) of manufacturing the flexible wire 100 of FIG. 1 according to an embodiment of the present invention. The order of operations of the manufacturing method described with reference to FIG. 5 is an example, and a case where the manufacturing method is performed in a different order, is also included in the technical idea of the present invention.

Referring to FIG. 5, the method (S100) of manufacturing the flexible wire 100 includes providing a light-transmitting substrate (S110), forming a graphene layer on the light-transmitting substrate (S120), and forming a nanomaterial layer on the light-transmitting substrate by using spin coating (S130). Thus, a hybrid wire structure including the graphene layer and the nanomaterial layer may be formed.

In providing of the light-transmitting substrate (S110), the light-transmitting substrate in which a flexible wire may be formed, is provided. The light-transmitting substrate is an example, and the technical idea of the present invention is not limited thereto.

Forming of the graphene layer (S120) can be implemented using a transfer technique, for example.

Figure 6:
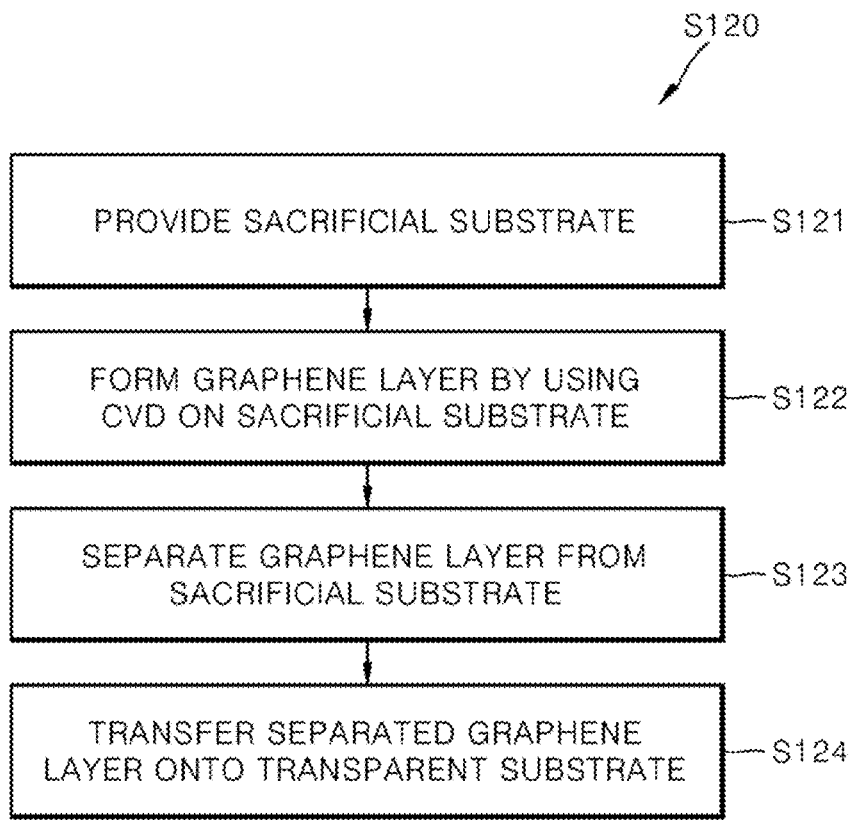
FIG. 6 is a flowchart illustrating an operation of forming a graphene layer in the method of manufacturing the flexible wire of FIG. 5 according to an embodiment of the present invention.

FIG. 6 is a flowchart illustrating an operation (S120) of forming the graphene layer in the method (S100) of manufacturing the flexible wire of FIG. 5 according to an embodiment of the present invention.

Operation (S120) of forming of the graphene layer includes providing a sacrificial substrate (S121), forming a graphene layer on the sacrificial layer by using CVD (S122), separating the graphene layer from the sacrificial substrate (S123), and transferring the separated graphene layer onto the light-transmitting substrate (S124).

Various types of substrates in which the graphene layer may be formed, may be used as the sacrificial substrate. The sacrificial substrate may include metal, for example, and may be a copper substrate, for example.

Operation of forming the graphene layer on the sacrificial layer by using CVD (S122) may be performed using a mixed gas of methane ($CH_4$), hydrogen ($H_2$), and argon (Ar), for example. However, this is an example, and the technical idea of the present invention is not limited thereto. Gas that may provide carbon for forming the graphene layer may be used in place of methane ($CH_4$).

Operation of separating the graphene layer (S123) may be performed by removing the sacrificial substrate using a proper etchant after the graphene layer is coated with poly methyl methacrylate (PMMA), for example. For example, when the sacrificial substrate is a copper substrate, the sacrificial substrate may be etched and removed using a copper etchant ($FeCl_3$) as the etechant.

Operation of separating the graphene layer (S123) and transferring the graphene layer onto the light-transmitting substrate (S124) may be performed using various techniques, for example, soft transfer printing, a polydimethylsiloxane (PDMS) transfer technique, a PMMA transfer technique, a thermal dissipation tape transfer technique or a roll transfer technique.

Referring back to FIG. 5, Operation of forming the nanomaterial layer (S130) may be performed by spin coating a solution including nanomaterials onto the light-transmitting substrate so that the graphene layer can contact and can be positioned on the light-transmitting substrate and a network can be formed by overlapping the nanomaterials. The nanomaterial layer may have a lower sheet resistance than that of the graphene layer.

Operation (S130) of forming the nanomaterial layer may be performed by spin coating the solution at the speed of about 100 to about 3000 rpm, for example, about 500 rpm. The spin coating process may be performed, for example, for about 1 second to about 10 minutes, for example, for about 30 seconds. The sheet resistance and transmittance of the flexible wire may be changed according to the spin speed of spin coating.

Operation (S130) of forming the nanomaterial layer may include drying the spin-coated nanomaterial layer. Through the drying process, the solvent included in the nanomaterial layer may be removed. However, the drying process may be optionally performed and may be omitted.

The drying process may be configured of a plurality of operations. The drying process may include a first drying operation of drying the nanomaterial layer in the range of temperature of about 80° C. to about 100° C., for example, at a temperature of about 90° C., for example, for about 50 seconds to about 150 seconds, for example, for about 90 seconds. Subsequently, the drying process may include a second drying operation of drying the nanomaterial layer in the range of temperature of about 140° C. to about 160° C., for example, at a temperature of about 150° C., for example, for about 50 seconds to about 150 seconds, for example, for about 90 seconds.

In an embodiment of the present invention, after Operation (S120) of forming the graphene layer is performed, Operation (S130) of forming the nanomaterial layer may be performed. In this case, the graphene layer and the nanomaterial layer may be sequentially stacked on the light-transmitting substrate. Thus, a hybrid wire structure including the graphene layer and the nanomaterial layer may be formed. Also, the flexible wire 100 of FIG. 1 may be implemented.

In another embodiment, after Operation (S130) of forming the nanomaterial layer (S130) is performed, Operation (S120) of forming the graphene layer may be performed. In this case, the nanomaterial layer and the graphene layer may be sequentially stacked on the light-transmitting substrate. Thus, a hybrid wire structure including the graphene layer and the nanomaterial layer may be formed. Also, the flexible wire 200 of FIG. 4 may be implemented.

Hereinafter, characteristics of a flexible wire according to an embodiment of the present invention will be examined. In the flexible wire mentioned below, PET was used to form the light-transmitting substrate, and silver (Ag) nanowires were used as nanomaterials included in the nanomaterial layer. As a comparative example, a flexible wire (referred to as Gr/PET) formed using only graphene on PET was selected.

Figure 7:
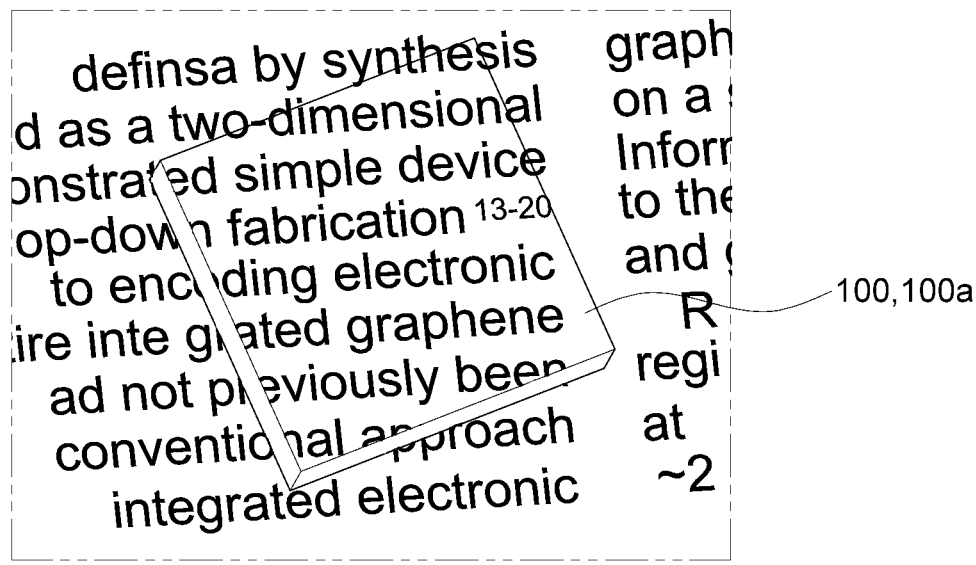
FIG. 7 is a photo showing flexible wires formed using the manufacturing method of FIG. 5 according to an embodiment of the present invention.

FIG. 7 is a photo showing the flexible wires 100 and 200 formed using the manufacturing method of FIG. 5 according to an embodiment of the present invention.

Referring to FIG. 7, the flexible wires 100 and 200 may have the structure of the flexible wire 100 of FIG. 1 or the structure of the flexible wire 200 of FIG. 4. The nanomaterial layer 130 may implement the flexible wires 100 and 200 using the Ag nanowires. As print types on a printed matter positioned on a bottom of the flexible wires 100 and 200 are clearly shown, the flexible wires 100 and 200 may have excellent light transmittance.

Figure 8:
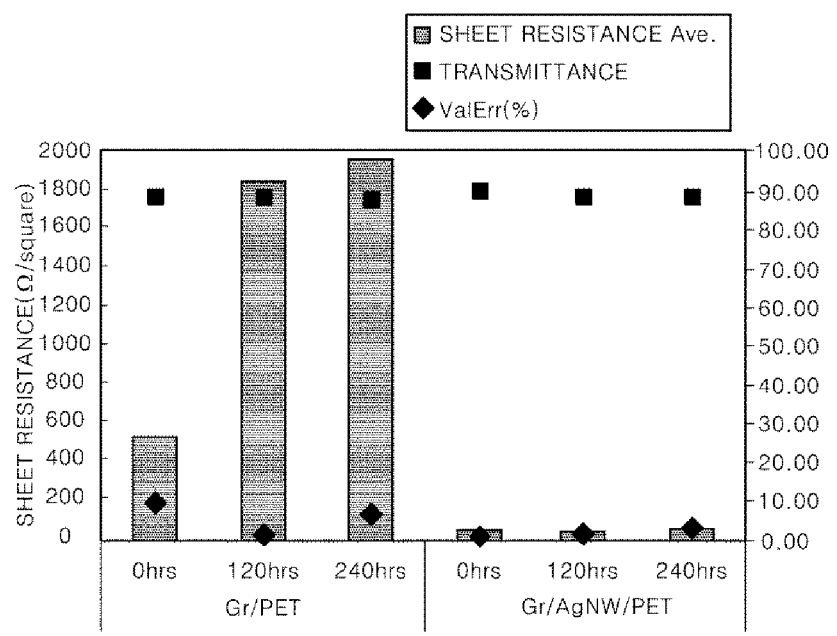
FIGS. 8 and 9 are graphs showing a high-temperature and high-humidity reliability test result of the flexible wire according to an embodiment of the present invention.
Figure 9:
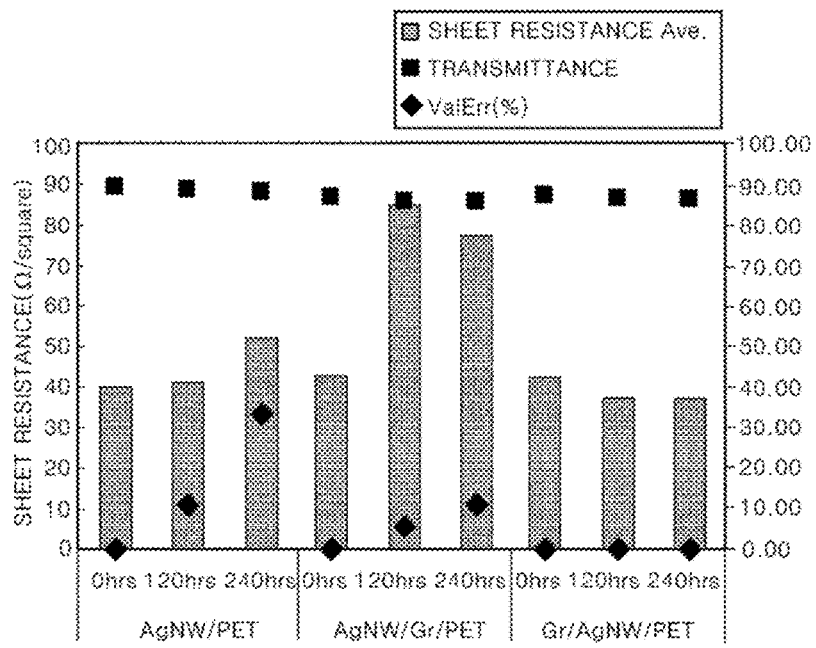

FIGS. 8 and 9 are graphs showing a high-temperature and high-humidity reliability test result of the flexible wire according to an embodiment of the present invention. A reliability test was carried out at a temperature of about 80° C., under humidity of about 80%, and for 240 hours.

Referring to FIG. 8, in the comparative example (Gr/PET), a sheet resistance was about 500 $\Omega$/square before the high-temperature and high-humidity reliability test was performed (0 hrs), was increased as the test was carried out, and then was about 2000 $\Omega$/square for 240 hours. On the other hand, flexible wires according to embodiments of the present invention showed a sheet resistance less than about 100 $\Omega$/square before and after the high-temperature and high-humidity reliability test was performed, respectively.

Referring to FIG. 9, according to the embodiment of the present invention, a flexible wire configured by stacking PET-nanomaterial layer-graphene layer (Gr/AgNW/PET) showed no change in sheet resistance before and after the high-temperature and high-humidity reliability test was performed. In detail, the flexible wire showed a sheet resistance that is about 40 $\Omega$/square or is equal to or less than 40 $\Omega$/square for 0 to 240 hours. On the other hand, according to the embodiment of the present invention, a flexible wire configured by stacking PET-graphene layer-nanomaterial layer (AgNW/Gr/PET) showed that a sheet resistance was increased as the high-temperature and high-humidity reliability test was performed. In detail, the flexible wire showed a sheet resistance of about 40 Ω/square for 0 hour and a sheet resistance of about 80 Ω/square for 240 hours. However, an increase in sheet resistance was changed very slightly compared to the comparative example in which the sheet resistance was increased to about 2000 Ω/square. Thus, the flexible wire according to the embodiment of the present invention can provide a very low sheet resistance compared to the flexible wire of the comparative example, and may provide a low sheet resistance continuously even when the flexible wire is used in a high-temperature and high-humidity state for a long time.

Transmittance of the flexible wire according to the embodiment of the present invention was hardly changed before and after the high-temperature and high-humidity reliability test was performed and was in the range of about 85% to about 90%. The same result of transmittance was shown in the flexible wire configured by stacking PET-graphene layer-nanomaterial layer and the flexible wire configured by stacking PET-nanomaterial layer-graphene layer. Also, the above-described transmittance was shown in nearly the same range as that of transmittance of the comparative example. Thus, the flexible wire according to the embodiment of the present invention can provide excellent transmittance.

Figure 10:
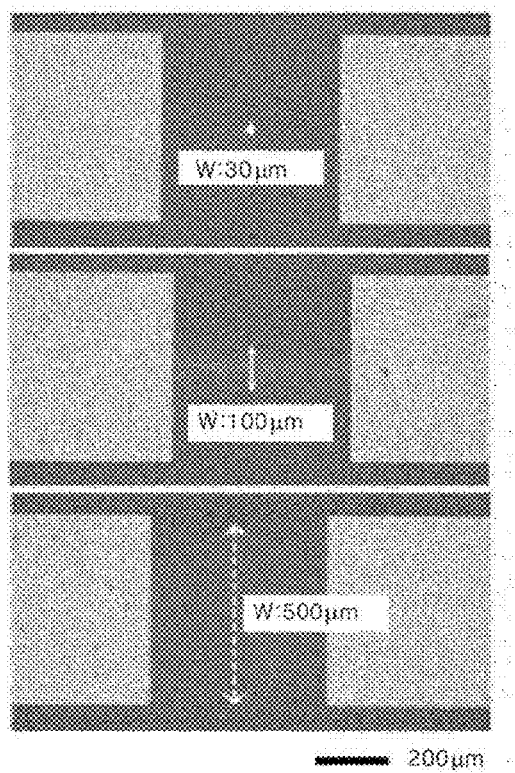
FIG. 10 is a photo showing a flexible wire having various widths so as to examine electrical characteristics of the flexible wire according to an embodiment of the present invention.

FIG. 10 is a photo showing a flexible wire having various widths so as to examine electrical characteristics of the flexible wire according to an embodiment of the present invention.

Referring to FIG. 10, a flexible wire that connects conductive patterns on both ends of the flexible wire was formed. The flexible wire was formed to have a width of about 30 μm, about 100 μm or about 500 μm. Also, the flexible wire having various widths in addition to the width was formed, and electrical characteristics of the flexible wire were examined.

FIGS. 11 through 14 are graphs showing electrical characteristics of the flexible wire according to an embodiment of the present invention.

Figure 11:
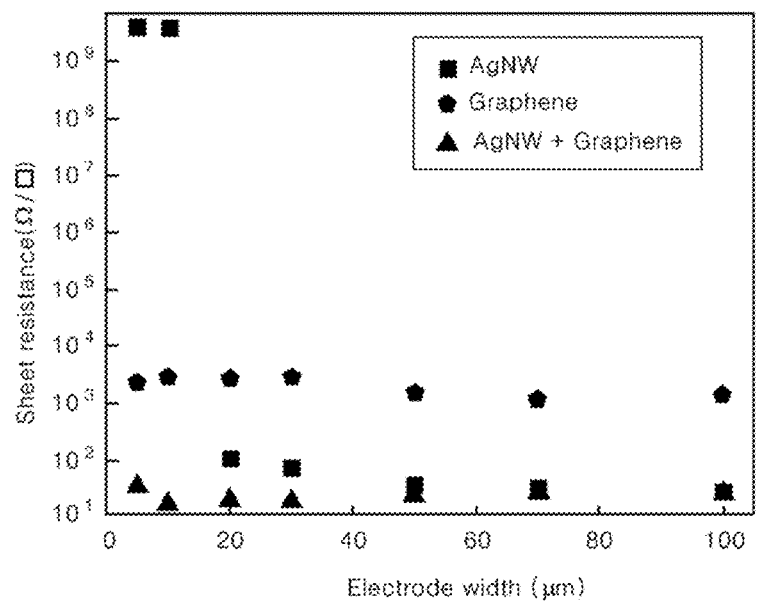
FIGS. 11 through 14 are graphs showing electrical characteristics of the flexible wire according to an embodiment of the present invention.

Referring to FIG. 11, as a comparative example, in a flexible wire in which only silver (Ag) nanowires (indicated by "AgNW") are formed on a light-transmitting substrate (for example, PET), when an electrode width of the flexible wire is equal to or greater than 20 μm, the flexible wire shows a very low sheet resistance, and when the electrode width of the flexible wire is less than 20 μm, the sheet resistance is rapidly increased and is very high, and the flexible wire has characteristics of an insulator in which internal electric charges do not flow freely. As another example, in a flexible wire in which only graphene (indicated by "Graphene") is formed on a light-transmitting substrate (for example, PET), a sheet resistance in the range of about $10^3 Ω/\square$ to about $10^4 Ω/\square$ is shown.

In the flexible wire according to the embodiment of the present invention (indicated by "AgNW+Graphene") shows a sheet resistance in the range of about $10^1 Ω/\square$ to about $10^2 Ω/\square$, and the range of the sheet resistance is maintained regardless of the thickness of the electrode width. Thus, the flexible wire according to the embodiment of the present invention does not show a change in sheet resistance even when the electrode width of the flexible wire is implemented to be 20 μm less than, compared to a flexible wire using only Ag nanowires so that a fine element can be formed. Also, the flexible wire according to the embodiment of the present invention has a low sheet resistance compared to that of a flexible wire using only graphene.

Figure 12:
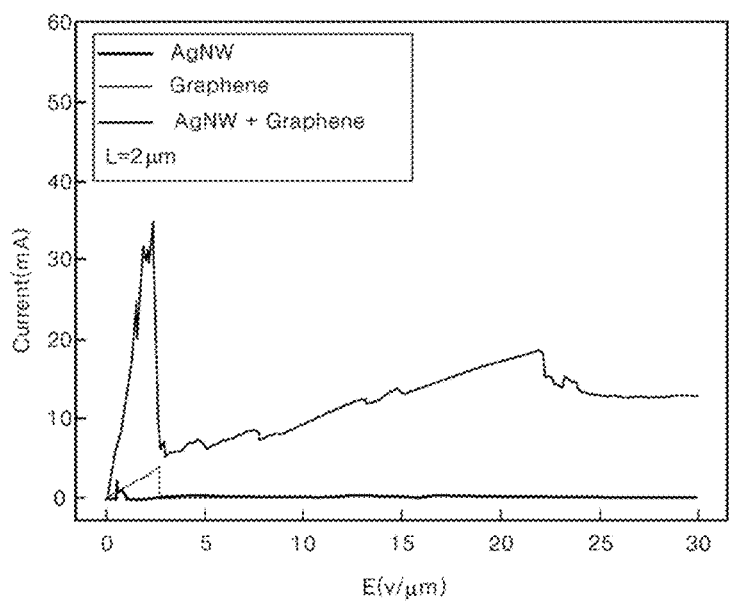

Referring to FIG. 12, when the electrode width of the flexible wire according to the embodiment of the present invention is 2 μm, in a current-electromotive force curve, a peak that is equal to or greater than 30 mA is shown in the range of 0 to 3 V/μm. When the electrode width of the flexible wire is increased to be equal to or greater than 3 V/μm, a current is gradually increased, and breakdown occurs in an electromotive force (E) at 20 V/μm. Thus, in the flexible wire according to the embodiment of the present invention, the current may flow at up to 20 V/μm that is the breakdown electromotive force in the above-described dimension. On the other hand, in the flexible wire using only Ag nanowires, breakdown occurs in the electromotive force of 1 V/μm in the dimension, and in the flexible wire using only graphene, breakdown occurs in 2.5 V/μm in the dimension. In both cases, a maximum current is equal to or less than 5 mA and is lower than a current value of the flexible wire according to the embodiment of the present invention. Thus, the flexible wire according to the embodiment of the present invention can implement element miniaturization.

Figure 13:
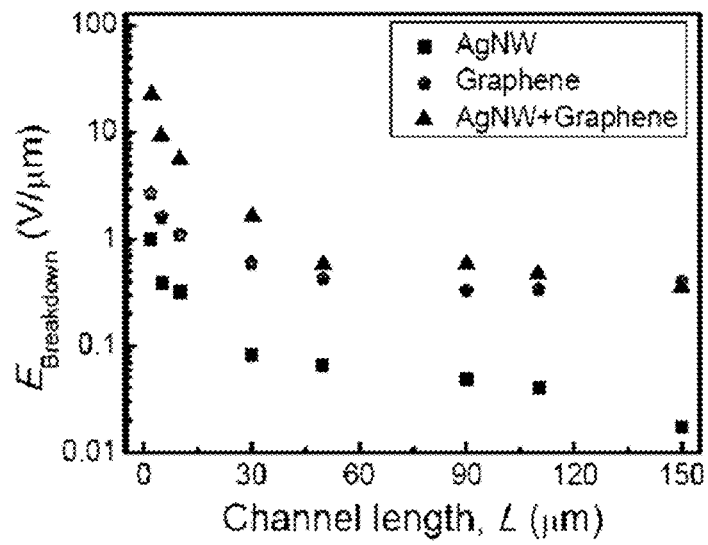

Referring to FIG. 13, in the flexible wire according to the embodiment of the present invention, a breakdown voltage ($E_{breakdown}$) according to a channel length is reduced as the channel length is increased, and then is hardly changed at the channel length that is equal to or greater than 30 μm. A similar behavior of the breakdown voltage is shown even in the flexible wire using only Ag nanowires or the flexible wire using only graphene. The flexible wire according to the embodiment of the present invention has a high breakdown voltage level compared to the flexible wire using only Ag nanowires or the flexible wire using only graphene. Thus, the flexible wire according to the embodiment of the present invention has high electric stability.

Figure 14:
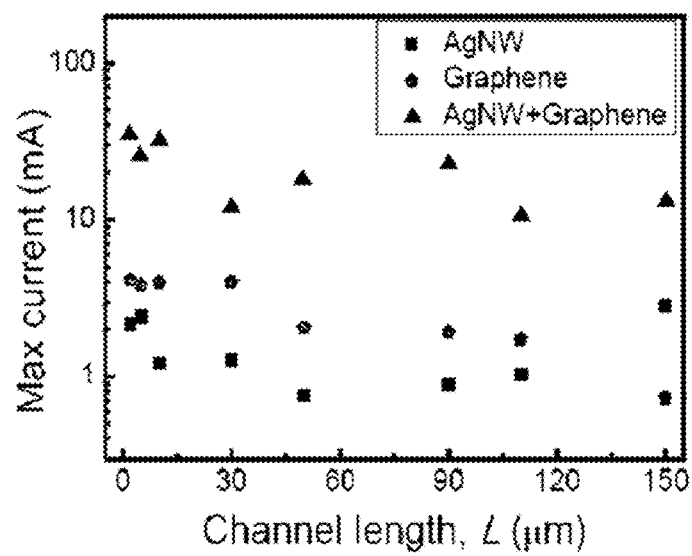

Referring to FIG. 14, the flexible wire according to the embodiment of the present invention has a higher maximum current according to the channel length than that of the flexible wire using only Ag nanowires or the flexible wire using only graphene. Thus, the flexible wire according to the embodiment of the present invention can allow a large amount of current to flow so that an amount of power can be increased.

Figure 15:
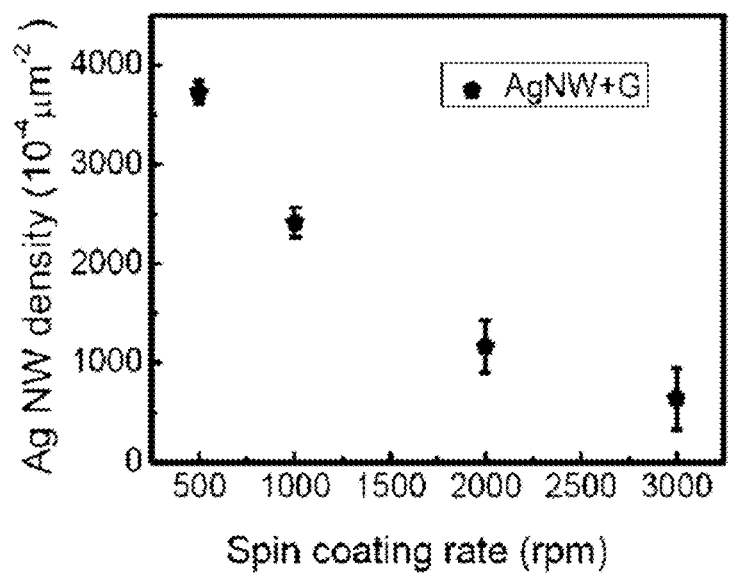
FIGS. 15 through 17 are graphs showing changes in physical characteristics and electrical characteristics of the flexible wire according to an embodiment of the present invention with respect to a spin coating rate in a spin coating process.
Figure 16:
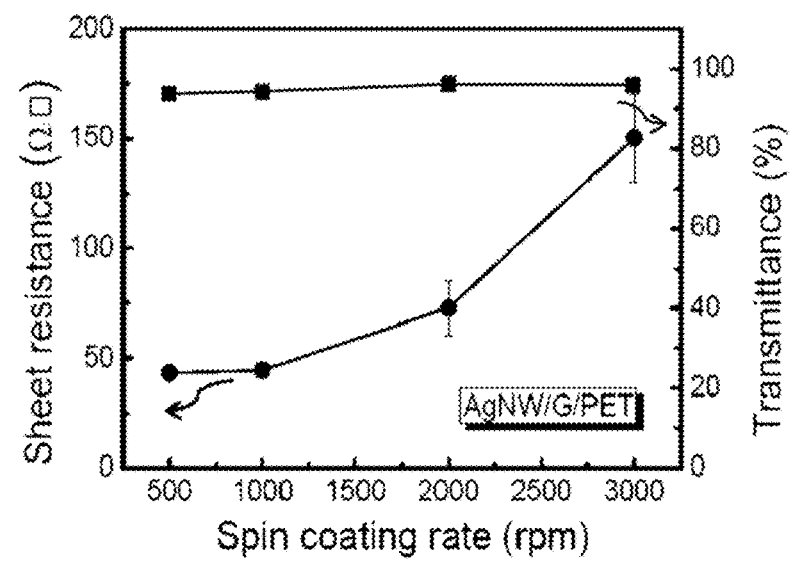
Figure 17:
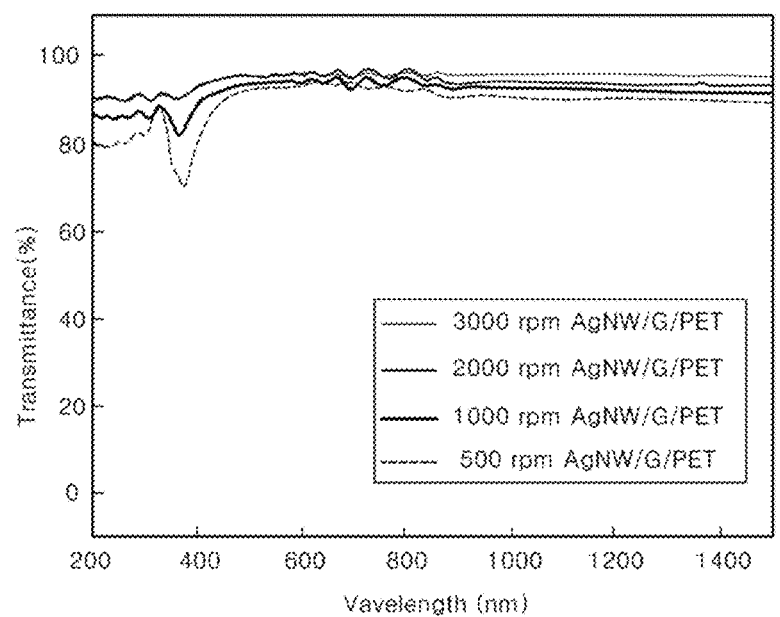

FIGS. 15 through 17 are graphs showing changes in physical characteristics and electrical characteristics of the flexible wire according to an embodiment of the present invention with respect to a spin coating rate in a spin coating process.

Referring to FIG. 15, as a spin coating rate was increased, the density of the Ag nanowires in the nanomaterial layer of the flexible wire was decreased.

Referring to FIG. 16, a sheet resistance of the flexible wire was lowest at the spin coating rate of 500 or 1000 rpm, and as the spin coating rate was increased, the sheet resistance of the flexible wire was increased. This coincides with the result that the density of the Ag nanowires was decreased as the spin coating rate of FIG. 15 was increased. That is, since the density of the Ag nanowires having high conductivity in the flexible wire was decreased, the sheet resistance of the flexible wire was increased. On the other hand, light transmittance of the flexible wire was constant regardless of an increase in the spin coating rate.

Referring to FIG. 17, as the spin coating rate was increased, transmittance of light was slightly increased, and a similar behavior was shown in the range of wavelength of 200 to 1400 nm. That is, the spin coating rate does not affect transmittance of light in the above-described range of wavelength.

Thus, from the result of FIGS. 15 through 17, when the spin coating rate is 500 or 1000 rpm, the flexible wire has a low sheet resistance and constant transmittance. Thus, the spin coating rate can be preferable.

Figure 18:
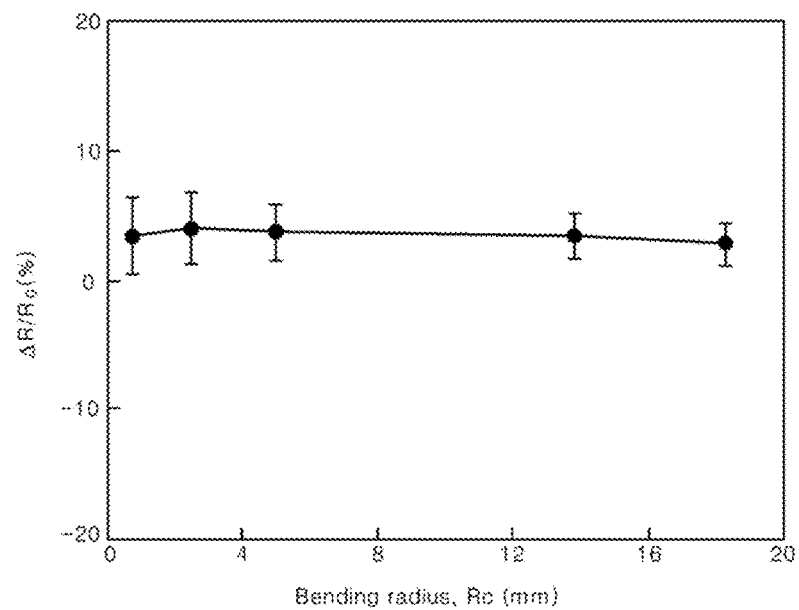
FIGS. 18 and 19 are graphs showing results in a case where the flexible wire according to the embodiment of the present invention are physically deformed.
Figure 19:
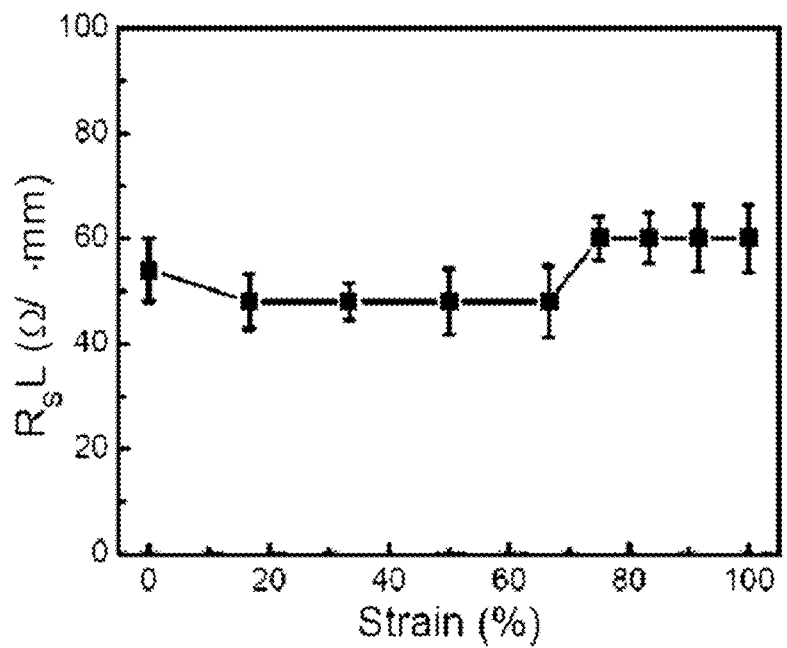

FIGS. 18 and 19 are graphs showing results in a case where the flexible wire according to the embodiment of the present invention are physically deformed.

Referring to FIG. 18, when the flexible wire according to the embodiment of the present invention is bent, a resistance change $\Delta R/R_0$ is nearly constant according to a bending radius.

Referring to FIG. 19, in the flexible wire according to the embodiment of the present invention, a resistance change $R_sL$ according to strain occurs hardly. However, although the resistance change $R_sL$ at strain of 80% is different from the resistance change $R_sL$ at strain that is equal to or greater than 80%, it is analyzed that there is no large change.

Figure 20:
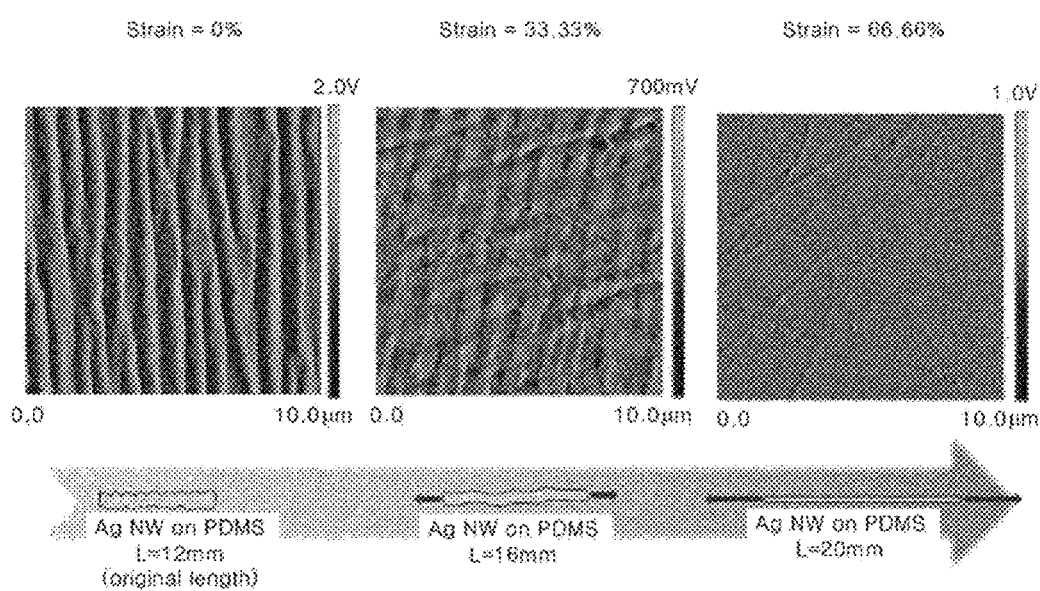
FIG. 20 is a tissue photo and a deformation view in a case where nanowires included in the flexible wire according to the embodiment of the present invention are tensile.

FIG. 20 is a tissue photo and a deformation view in a case where nanowires included in the flexible wire according to the embodiment of the present invention are tensile.

Referring to FIG. 20, the nanowires are not cut at strain of 66.6%, and a length of the nanowires may be increased. Thus, the flexible wire using the nanowires can provide excellent flexible characteristics and furthermore, foldable characteristics.

Hereinafter, a stack type flexible wire in which a plurality of hybrid wire structures including a single graphene layer and a single nanomaterial layer are stacked, will be described. The stack type flexible wire may have flexible characteristics and furthermore, foldable characteristics.

FIGS. 21 through 24 are cross-sectional views of stack type flexible wires 300, 300a, 300b, and 300c according to an embodiment of the present invention. In the embodiment illustrated in FIG. 21, a part of components of the flexible wires 100 and 200 according to the above-described embodiments is changed and thus, a redundant description thereof will be omitted.

Figure 21:
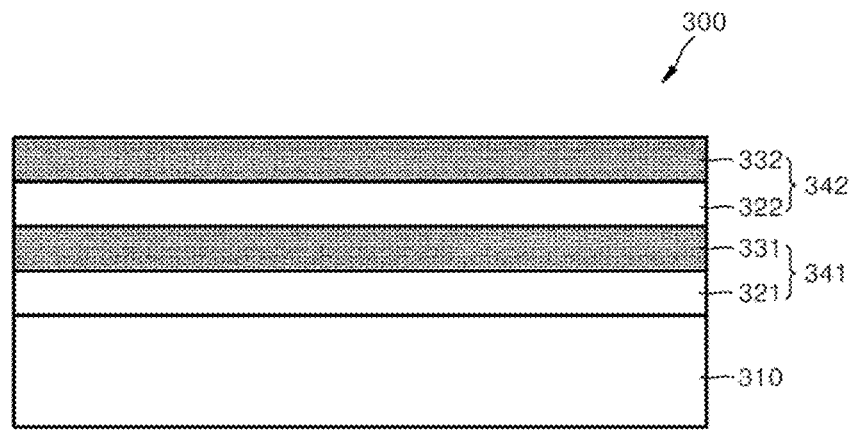
FIGS. 21 through 24 are cross-sectional views of stack type flexible wires according to an embodiment of the present invention.

Referring to FIG. 21, the stack type flexible wire 300 includes a first hybrid wire structure 341 and a second hybrid wire structure 342, which are positioned on a light-transmitting substrate 110. The first hybrid wire structure 341 and the second hybrid wire structure 342 of FIG. 21 may correspond to the hybrid wire structure 140 of FIG. 1.

The first hybrid wire structure 341 may be configured to include a single first graphene layer 321 and a single first nanomaterial layer 331. The first nanomaterial layer 331 may be positioned on the first graphene layer 132 while contacting the first graphene layer 321, may include first nanomaterials that form a network by overlapping each other, and may have a low sheet resistance compared to that of the first graphene layer 321.

The second hybrid wire structure 342 may be configured to include a single second graphene layer 322 and a single second nanomaterial layer 332. The second nanomaterial layer 332 may be positioned on the second graphene layer 322 while contacting the second graphene layer 322, may include second nanomaterials that form a network by overlapping each other, and may have a low sheet resistance compared to that of the second graphene layer 322.

The first nanomaterial layer 331, the second nanomaterial layer 332 or both thereof may include metal nanomaterials or CNTs. Also, the first nanomaterial layer 331, the second nanomaterial layer 332 or both thereof may include at least one of nanowires, nanoparticles, nanorods, nanowalls, nanotubes, nanobelts, and nanorings.

The first graphene layer 321 and the second graphene layer 322 of FIG. 21 may correspond to the graphene layer 120 of FIG. 1. The first nanomaterial layer 331 and the second nanomaterial layer 332 of FIG. 21 may correspond to the nanomaterial layer 130 of FIG. 1. The first nanomaterials included in the first nanomaterial layer 331 of FIG. 21 and the second nanomaterials included in the second nanomaterial layer 332 of FIG. 21 may be the same as or similar to the nanomaterials included in the nanomaterial layer 130, as described with reference to FIG. 1.

The first graphene layer 321 and the second graphene layer 322 may have same or different materials, shapes, and dimensions. Also, the first nanomaterial layer 331 and the second nanomaterial layer 332 may have same or different materials, shapes, and dimensions.

Also, the first graphene layer 321 and the second graphene layer 322 are examples, and the technical idea of the present invention is not limited thereto. A case where the first graphene layer 321 and the second graphene layer 322 are configured of graphite or CNTs, is also included in the technical idea of the present invention.

In the embodiment illustrated in FIG. 21, the first hybrid wire structure 341 and the second hybrid wire structure 342 are sequentially stacked on the light-transmitting substrate 310. Also, the first graphene layer 321, the first nanomaterial layer 331, the second graphene layer 322, and the second nanomaterial layer 332 are sequentially disposed on the light-transmitting substrate 310.

Figure 22:
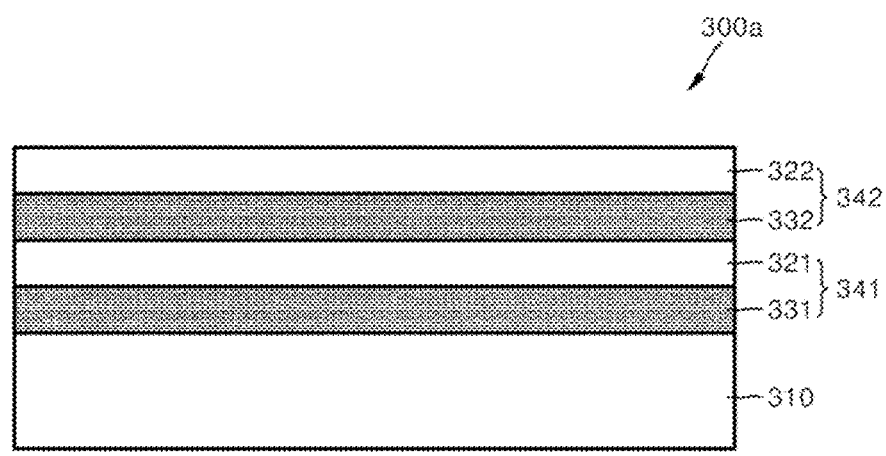
Figure 23:
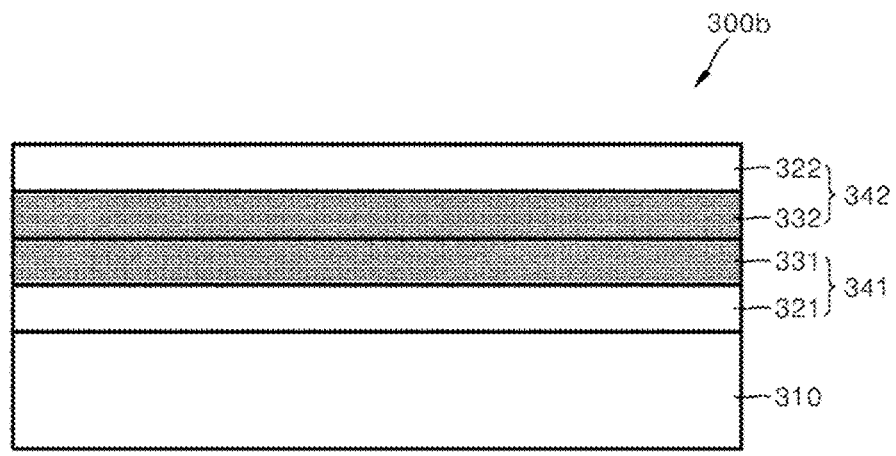
Figure 24:
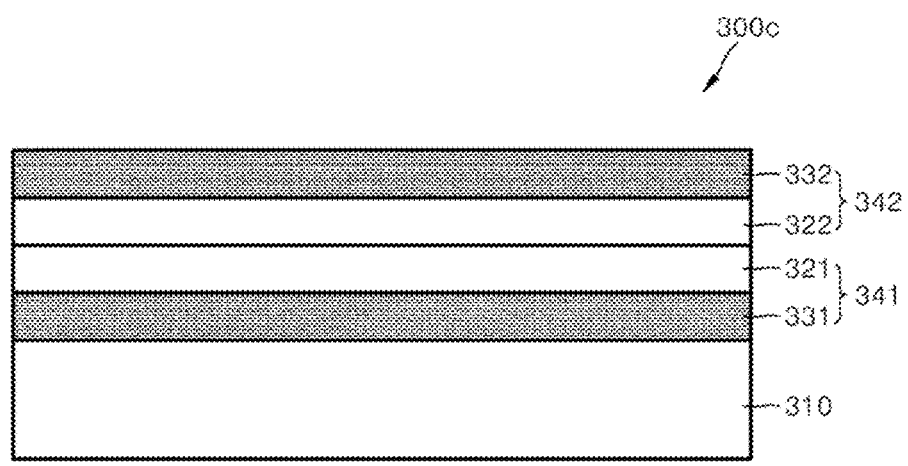

FIGS. 22 through 24 illustrates a case where the order of the first graphene layer 321, the first nanomaterial layer 331, the second graphene layer 322, and the second nanomaterial layer 332 is different in the stack type flexible wires 300a, 300b, and 300c.

Referring to FIG. 22, in the stack type flexible wire 300a, the first nanomaterial layer 331, the first graphene layer 321, the second nanomaterial layer 332, and the second graphene layer 322 are sequentially disposed on the light-transmitting substrate 310.

Referring to FIG. 23, in the stack type flexible wire 300b, the first graphene layer 321, the first nanomaterial layer 331, the second nanomaterial layer 332, and the second graphene layer 322 are sequentially disposed on the light-transmitting substrate 310. In this case, the first nanomaterial layer 331 and the second nanomaterial layer 332 can be entangled with each other and coupled to each other. Also, the first graphene layer 321 and the second graphene layer 322 can be substantially integrated with one layer and coupled to each other.

Figure 25:
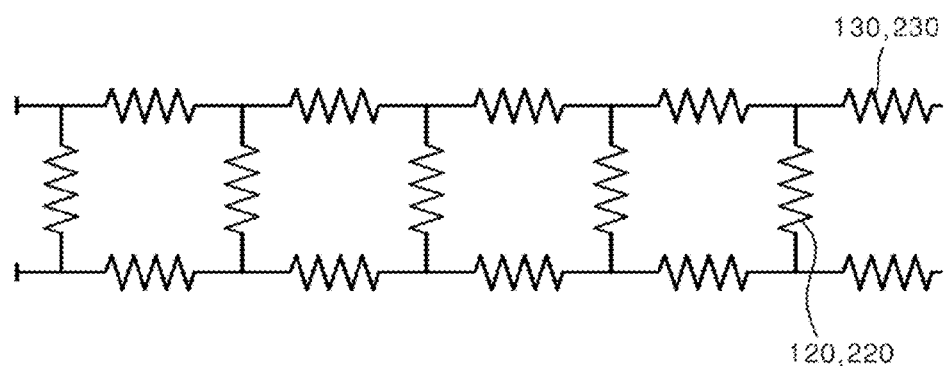
FIGS. 25 and 26 are views of circuit configurations of the stack type flexible wires according to an embodiment of the present invention.
Figure 26:
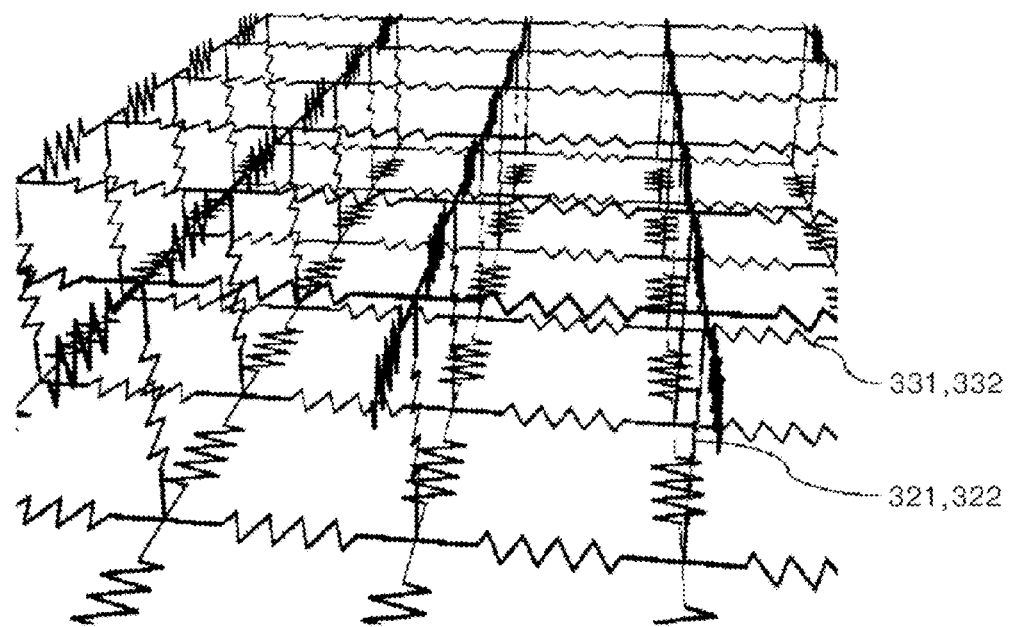

FIGS. 25 and 26 are views of circuit configurations of the stack type flexible wires according to an embodiment of the present invention.

FIG. 25 illustrates a case where the flexible wires 100 and 200 are configured of a single-layer hybrid wire structures 140 and 240 including graphene layers 120 and 220 and nanomaterial layers 130 and 230, respectively, as illustrated in FIGS. 1 and 4. On the other hand, FIG. 26 illustrates a case where the stack type flexible wires 300, 300a, 300b, and 300c are configured of a plurality of hybrid wire structures 341 and 342 including graphene layers 321 and 322 and nanomaterial layers 331 and 332, respectively, as illustrated in FIGS. 21 through 24.

Referring to FIG. 25, nanomaterials included in the nanomaterial layers 130 and 230 may constitute a serially-connected circuit, and the graphene layers 120 and 220 may constitute an in-parallel-connected circuit of the nanomaterials. However, as the graphene layers 120 and 220 and the nanomaterial layers 130 and 230 are respectively configured as one layer, the number of parallel connections is small so that electric characteristics may be lowered and flexibility and elasticity may not be effective.

Referring to FIG. 26, the nanomaterials included in the nanomaterial layers 331 and 332 may constitute a serially-connected circuit, and the graphene layers 321 and 322 may constitute an in-parallel-connected circuit of the nanomaterials. Also, as the nanomaterial layers 331 and 332 and the graphene layers 321 and 322 are configured of a plurality of layers, the nanomaterial layers 331 and 332 may further constitute an in-parallel-connected circuit, and the graphene layers 321 and 322 may further constitute a serially-connected circuit. Thus, the nanomaterial layers 331 and 332 and the graphene layers 321 and 322 have more parallel connections so that the entire resistance can be reduced. Also, an increase in flexibility and elasticity can be provided.

The stack type flexible wires 300, 300a, 300b, and 300c illustrated in FIGS. 21 through 24 illustrate a case where two-layer hybrid wire structures are included. However, this is an example, and the technical idea of the present invention is not limited thereto. That is, in the stack type flexible wire, two or more hybrid wire structures can be further stacked.

Figure 27:
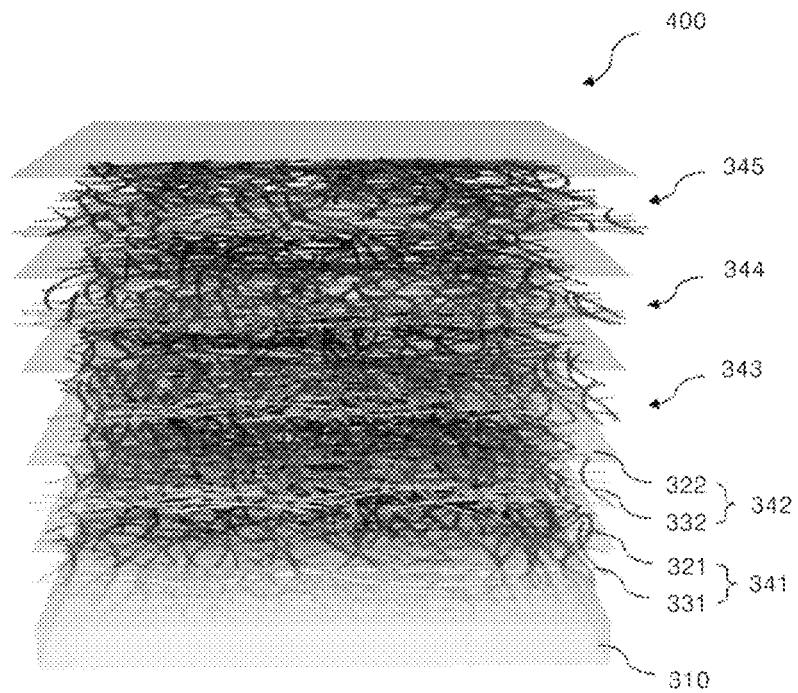
FIGS. 27 and 28 are views of stack type flexible wires according to an embodiment of the present invention.
Figure 28:
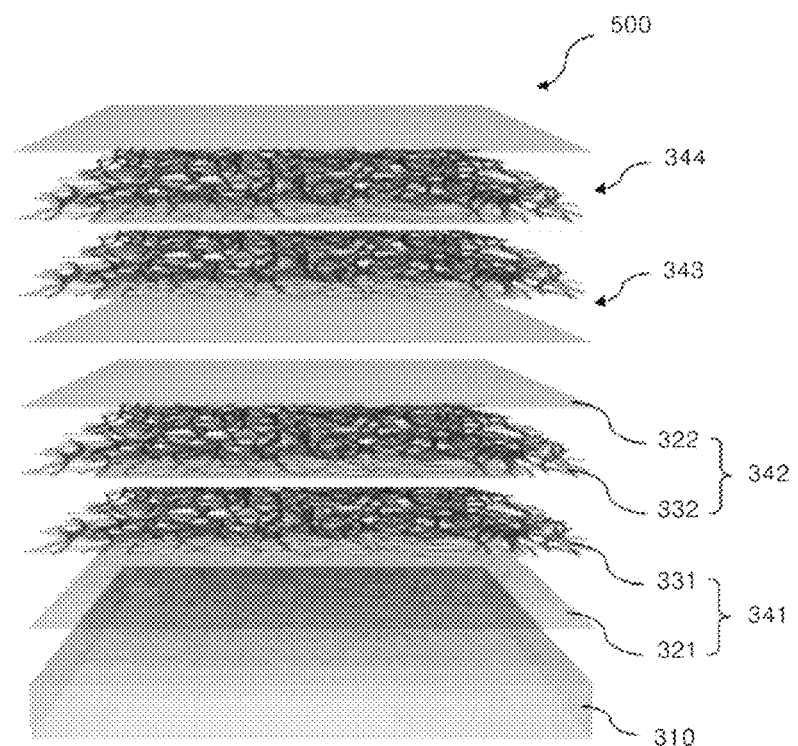

FIGS. 27 and 28 are views of stack type flexible wires according to an embodiment of the present invention. FIGS. 27 and 28 illustrate stack type flexible wires 400 and 500 formed by stacking two or more hybrid wire structures. For clear explanation of the present invention, although layers are separately disposed, it will be noted that, in reality, the layers are disposed to be in contact with each other.

Referring to FIG. 27, in the stack type flexible wire 400, five-layer hybrid wire structures are stacked on the light-transmitting substrate 310. That is, a first hybrid wire structure 341, a second hybrid wire structure 342, a third hybrid wire structure 343, a fourth hybrid wire structure 344, and a fifth hybrid wire structure 345 are stacked on the light-transmitting substrate 310. Each of the first through fifth hybrid wire structures 341, 342, 343, 344, and 345 includes nanomaterial layers 331 and 332 and graphene layers 321 and 322. Also, a method of stacking the nanomaterial layers 331 and 332 and the graphene layers 321 and 321 is performed by including stacking the first graphene layer 321 on the first nanomaterial layer 331 and sequentially stacking the second nanomaterial layer 332 and the second graphene layer 322 on the first graphene layer 321 again, as illustrated in FIG. 22. In the present specification, the stacking method is referred to as "ABAB" type stacking. Also, a case where the above-mentioned layers are stacked by the stacking method of FIG. 21, is also included in the technical idea of the present invention.

Referring to FIG. 28, in the stack type flexible wire 500, four-layer hybrid wire structures are stacked on the light-transmitting substrate 310. That is, a first hybrid wire structure 341, a second hybrid wire structure 342, a third hybrid wire structure 343, and a fourth hybrid wire structure 344 are stacked on the light-transmitting substrate 310. Each of the first through fourth hybrid wire structures 341, 342, 343, and 344 includes the nanomaterial layers 331 and 332 and the graphene layers 321 and 322. Also, a method of stacking the nanomaterial layers 331 and 332 and the graphene layers 321 and 322 is performed by stacking the first nanomaterial layer 331 on the first graphene layer 321 and sequentially stacking the second nanomaterial layer 331 and the second graphene layer 322 on the first graphene layer 321 again, as illustrated in FIG. 23. Thus, the first nanomaterial layer 331 and the second nonmaterial layer 332 contact directly. In the present specification, the stacking method is referred to as "BAAB" type stacking. Also, a case where the above-mentioned layers are stacked by the stacking method of FIG. 24, is also included in the technical idea of the present invention.

Figure 29:
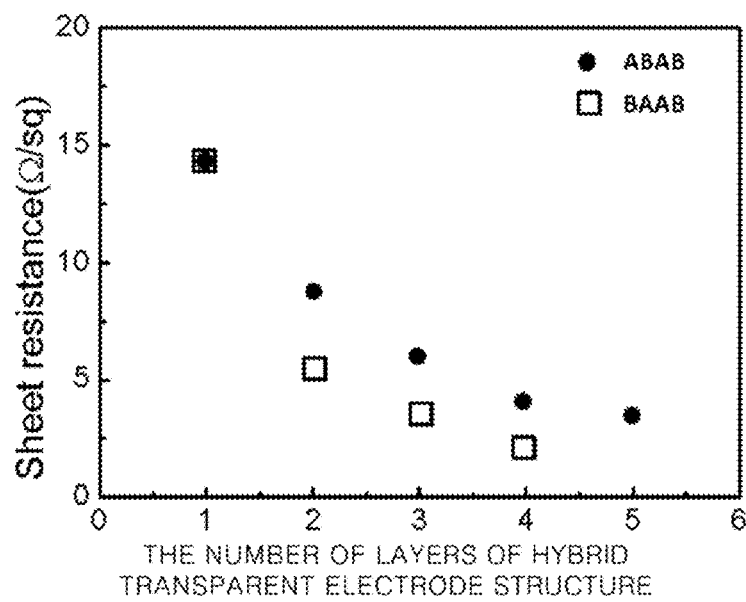
FIG. 29 is a graph showing a change in sheet resistance with respect to the number of layers of hybrid wire structures of the stack type flexible wires according to an embodiment of the present invention.

FIG. 29 is a graph showing a change in sheet resistance with respect to the number of layers of hybrid wire structures of the stack type flexible wires 400 and 500 according to an embodiment of the present invention. The stack type flexible wire 400 of FIG. 27 is indicated by "ABAB", and the stack type flexible wire 500 of FIG. 28 is indicated by "BAAB".

Referring to FIG. 29, in both cases, as the number of layers of hybrid wire structures is increased, a sheet resistance is reduced and is close to a sheet resistance of general metal. Comparing "ABAB" with "BAAB", a reduction value of the sheet resistance in the case of "BAAB" is larger than that in the case of "ABAB". This means that, as a physical and/or electric contact of nanomaterials included in nanomaterial layers is increased, the sheet resistance is further reduced. When the number of layers of the hybrid wire structures is more than five, it is expected that the sheet resistance is hardly reduced or is not significant.

Figure 30:
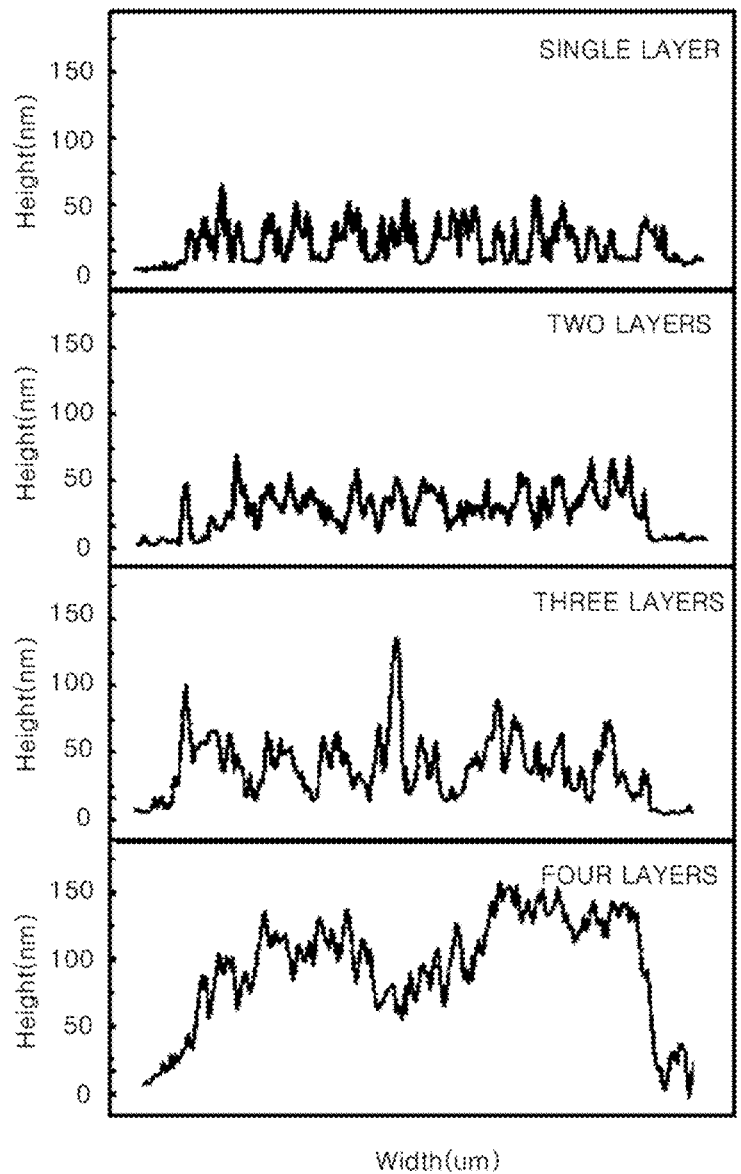
FIG. 30 is a graph using an atomic force microscope (AFM) showing a change in height with respect to the number of layers of hybrid wire structures of the stack type flexible wire according to an embodiment of the present invention.

FIG. 30 is a graph using an atomic force microscope (AFM) showing a change in height with respect to the number of layers of hybrid wire structures of the stack type flexible wire 400 according to an embodiment of the present invention. In FIG. 30, a stacking technique is the case of "ABAB", as described in FIG. 27.

Referring to FIG. 30, when a hybrid wire structure is configured of a single layer, a maximum height of the stack type flexible wire 400 is 70 nm. However, when the hybrid wire structure is configured of two layers, the stack type flexible wire 400 has nearly similar height to the case where the hybrid wire structure is configured of a single layer, and the maximum height of the stack type flexible wire 400 is 70 nm that is similar to the case where the hybrid wire structure is configured of a single layer (not 140 nm that is twice 70 nm that is an arithmetically-calculated value. Even when the hybrid wire structure is configured of three layers and four layers, the entire height of the stack type flexible wire 400 is increased but is lower than a maximum height that is arithmetically calculated, i.e., in the case of three layers, 210 nm and in the case of four layers, 280 nm.

This means that a nanomaterial layer is covered by a graphene layer having a thin film, such as a film, so that the hybrid wire structure may have rough surface morphology. Nanomaterials of different nanomaterial layers may be inserted into a valley in the rough surface morphology, consequently, a reduction in a height can be shown. As such, the hybrid wire structure can implement a close contact between the nanomaterial layer and the graphene layer. Thus, the stack type flexible wire can have excellent electric characteristics and can be formed to be thin. That is, in FIG. 21, the entire height of the first hybrid wire structure 341 and the second hybrid wire structure 342 may be smaller than a separate sum of the height of the first hybrid wire structure 341 and the height of the second hybrid wire structure 342.

It was ascertained that resistivity when the hybrid wire structure is stacked from one to four layers, is in the range of 0.2 to 0.3 μΩm. Thus, as the hybrid wire structure is stacked, its thickness is increased. However, since a resistivity value can be maintained at a constant level, excellent electric characteristics can be provided and simultaneously, excellent mechanical characteristics can be provided due to the large thickness. Also, resistivity when the hybrid wire structure is stacked from one to four layers may be in the range of 0.1 to 1.0 µΩm.

Figure 31:
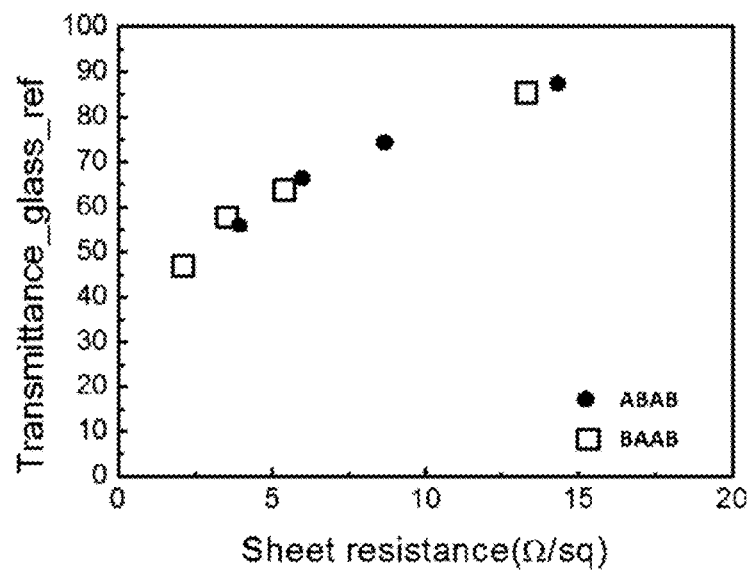
FIG. 31 is a graph showing light transmittance with respect to sheet resistance of the stack type flexible wire according to an embodiment of the present invention.

FIG. 31 is a graph showing light transmittance with respect to sheet resistance of the stack type flexible wire according to an embodiment of the present invention.

Referring to FIG. 31, as the sheet resistance of the stack type flexible wire is increased, light transmittance is increased. That is, as the number of stacking of the hybrid wire structure in the stack type flexible wire is increased, the sheet resistance of the stack type flexible wire is reduced. Thus, light transmittance is increased. This tendency is nearly similar both in an "ABAB" stacking technique and a "BAAB" stacking technique. On the other hand, even when the sheet resistance is equal to or less than 5Ω/□, light transmittance that is equal to or greater than about 50 is shown so that the stack type flexible wire can provide relatively high light transmittance.

Figure 32:
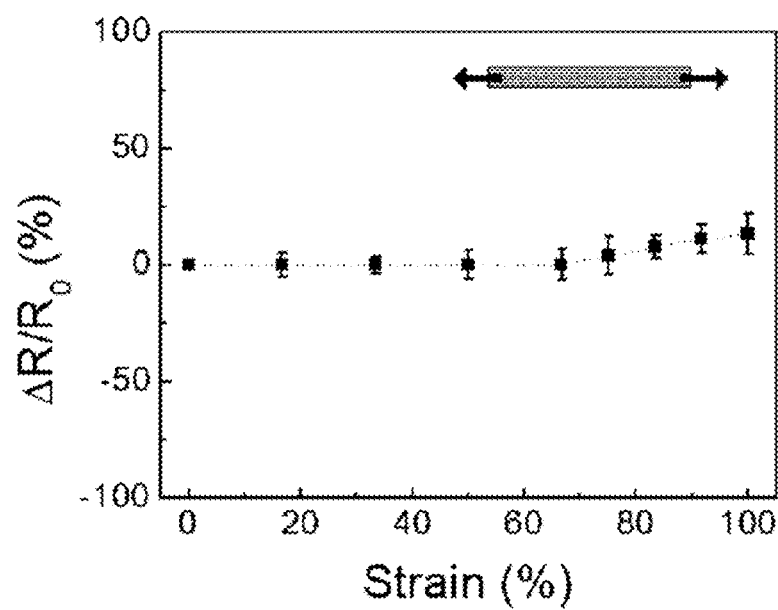
FIG. 32 is a graph showing a resistance change with respect to strain of the stack type flexible wire according to an embodiment of the present invention.

FIG. 32 is a graph showing a resistance change $\Delta R/R_0$ with respect to strain of the stack type flexible wire according to an embodiment of the present invention.

Referring to FIG. 32, the stack type flexible wire has a resistance change in the range of 0 to 20% with respect to strain in the range of 0 to 100%. In particular, there is no resistance change with respect to strain in the range of 0 to 70%. As such, the stack type flexible wire according to an embodiment of the present invention shows constant electric characteristics nearly regardless of tension and compression caused by an external force. Thus, it can be predicted that the stack type flexible wire can be used as an electrode that requires flexibility.

Figure 33:
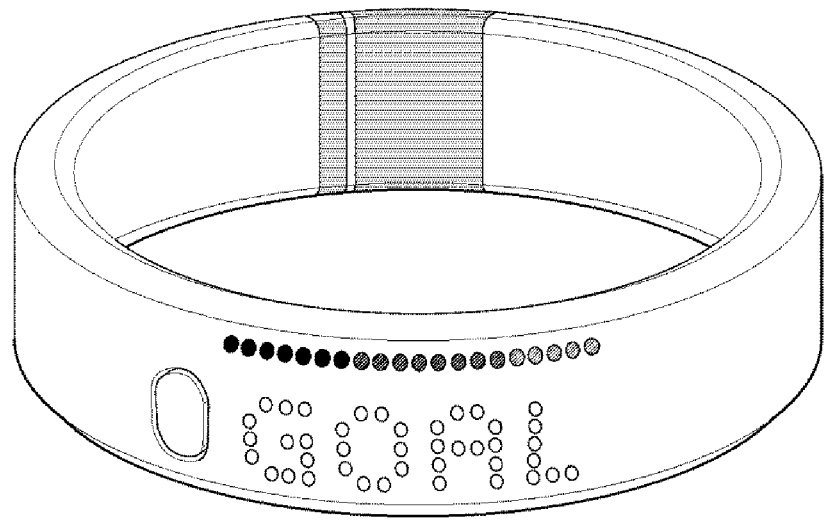
FIGS. 33 and 34 are photos showing applied examples of the stack type flexible wire according to an embodiment of the present invention.
Figure 34:
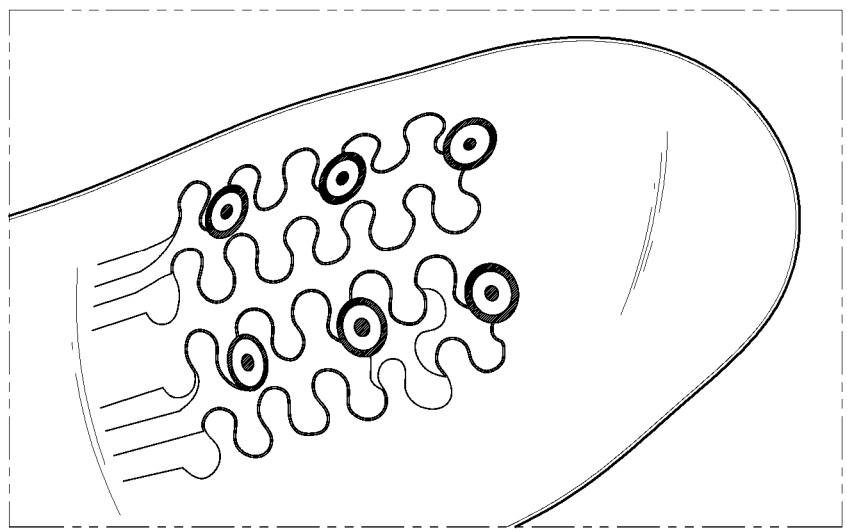

FIGS. 33 and 34 are photos showing applied examples of the stack type flexible wire according to an embodiment of the present invention.

Referring to FIG. 33, a watch to which the stack type flexible wire according to an embodiment of the present invention is applied, is shown. A portion of the watch excluding a watch strap generally has no flexibility. However, when the stack type flexible wire according an embodiment of the present invention is used, the stack type flexible wire can be ductilely and flexibly deformed to be suitable for a user's wrist so that a more excellent wearing feeling can be provided.

Referring to FIG. 34, a medical glove to which the stack type flexible wire according to an embodiment of the present invention is applied, is shown. Due to development in a medical field, when diseases are treated, a delicate touch is required to treat diseases, and in order to overcome a limitation in sensing a hand of man, the limitation can be overcome by attaching a sensor to the glove. When a wire is formed using general metal, flexibility is limited, which may lower movement of the hand. However, the stack type flexible wire according to an embodiment of the present invention can use flexibility, movement of the hand can be more freely made. In FIG. 34, the stack type flexible wire according to an embodiment of the present invention can be used instead of wires having colors. In this case, the stack type flexible wire cannot be watched due to transparency.

Also, the stack type flexible wire according to the technical idea of the present invention can be applied to various electronic devices. For example, the stack type flexible wire can be applied to an optical element device, such as a light-emitting diode (LED) or a laser diode (LD), a display device, such as a liquid crystal display (LCD) or an organic light-emitting display (OLED), or a touch panel device.

Hereinafter, a bezel-free display device that is configured to include the above-described flexible wire and removes a bezel area by using the flexible wire, will be described. In the present specification, "bezel-free" means that a terminal that has been generally formed in the bezel area is formed on an opposite side with respect to a display member and do not include the bezel area.

Figure 35:
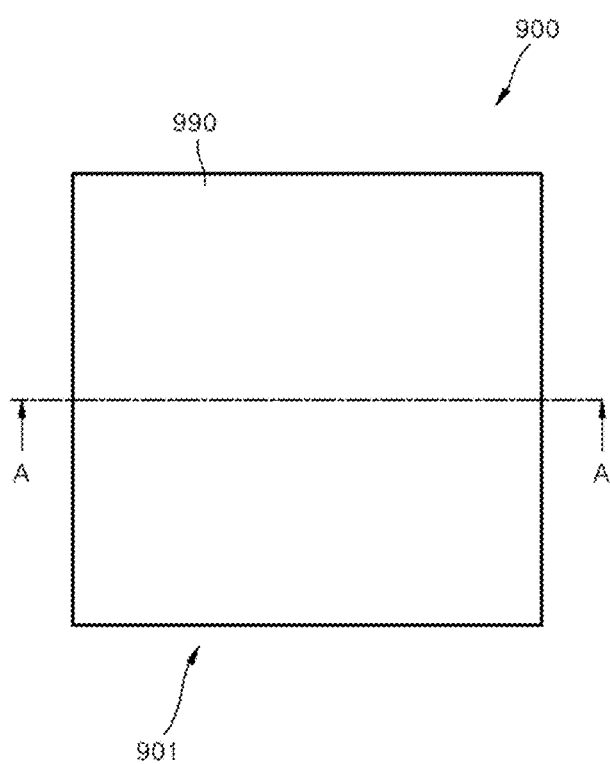
FIG. 35 is a top view of a bezel-free display device according to an embodiment of the present invention.
Figure 36:
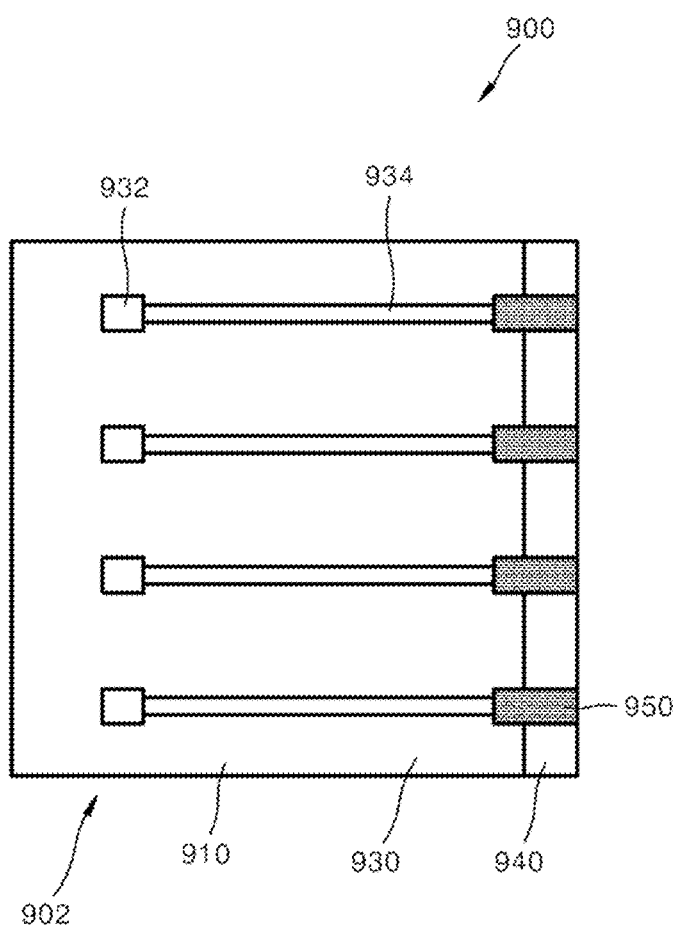
FIG. 36 is a rear view of the bezel-free display device of FIG. 35 according to an embodiment of the present invention.
Figure 37:
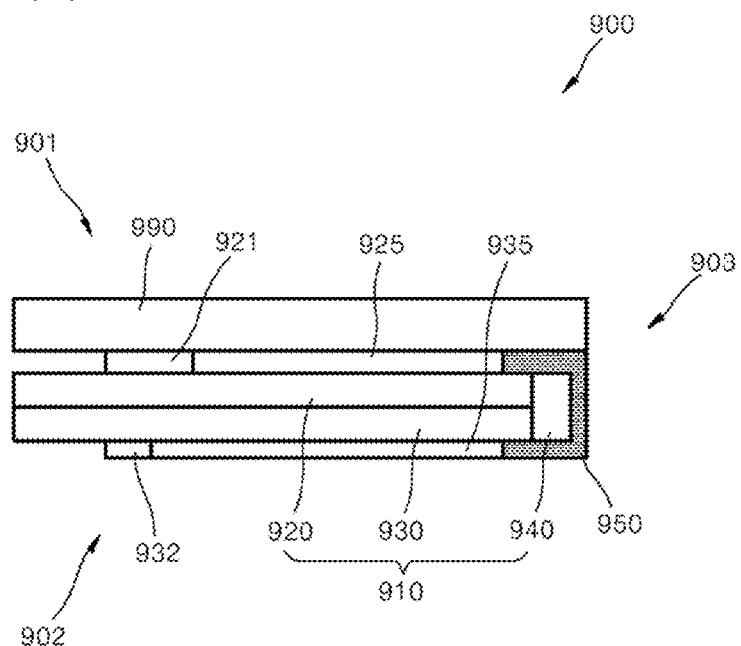
FIG. 37 is a cross-sectional view of the bezel-free display device taken along line A-A of FIG. 35.

FIG. 35 is a top view of a bezel-free display device 900 according to an embodiment of the present invention. FIG. 36 is a rear view of the bezel-free display device 900 of FIG. 35 according to an embodiment of the present invention. FIG. 37 is a cross-sectional view of the bezel-free display device 900 taken along line A-A of FIG. 35.

Figure 38:
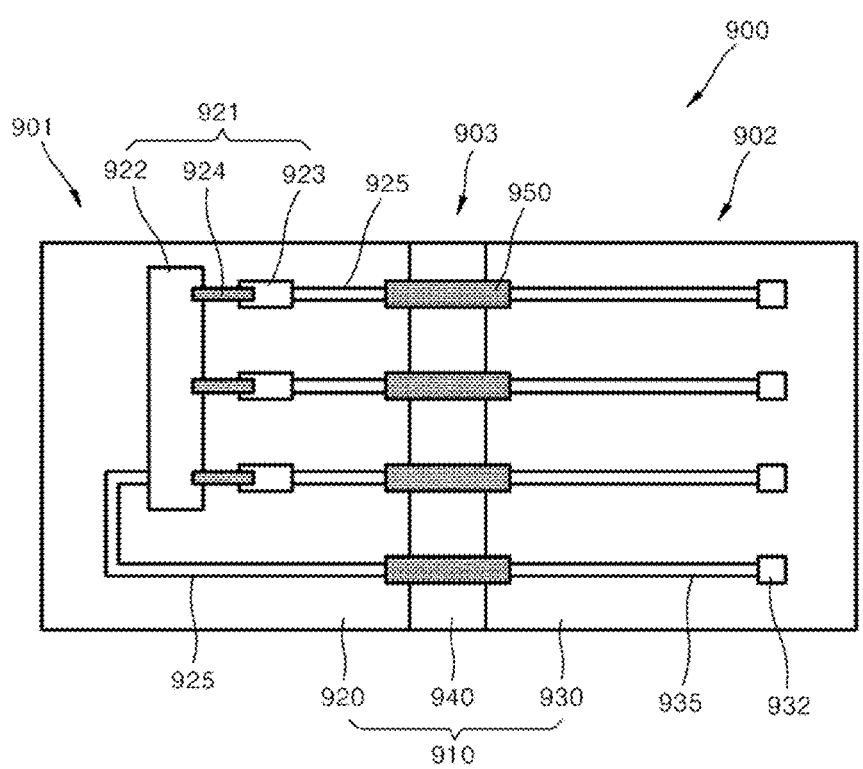
FIG. 38 is a top view in which a flexible substrate of the bezel-free display device of FIG. 35 is unfolded.

FIG. 38 is a top view in which a flexible substrate 910 of the bezel-free display device 900 of FIG. 35 is unfolded.

Referring to FIGS. 35 through 38, the bezel-free display device 900 may include the flexible substrate 910, a display member 990, and a flexible wire 950. The bezel-free display device 900 includes the display member 990 positioned on an upper surface 901 thereof and terminal 932 positioned on a rear surface 902 thereof. Also, the bezel-free display device 900 includes the flexible wire 950 positioned on sides 903 thereof.

The flexible substrate 910 may include an element area 920, a terminal area 930, and a flexible area 940. The element area 920 may include an electronic element 921 and may be positioned on the upper surface 901. The terminal area 930 may include the terminal 932 electrically connected to the electronic element 921 and may be positioned on the rear surface 902 thereof. The flexible area 940 may be positioned between the element area 920 and the terminal area 930 and may have flexibility.

The element area 920 may include the electronic element 921, such as a transistor. The electronic element 921 may include various electronic elements that are generally used in a display device, and in the current embodiment, a case where a transistor structure is used as the electronic element 921, will be described. The electronic element 921 may include a source area 922, a drain area 923, and a channel area 924. The source area 922 may be a common source area, and the present invention is not limited thereto. The channel area 924 may have the same material and configuration as those of the flexible wire 950, as will be described below. Also, a case where the channel area 924 is configured of only a graphene layer, is also included in the technical idea of the present invention.

The element area 920 may include an element area wire 925. The element area wire 925 may electrically connect the electronic element 921 and the flexible wire 950. In detail, the element area wire 925 may be physically and/or electrically connected to the source area 922 or the drain area 923 of the element area 920 at an end of the element area wire 925 and may be physically and/or electrically connected to the flexible wire 950 at the other end of the element area wire 925. The element area wire 925 may include a material having relatively rigidity compared to the flexible wire 950, for example, metal, such as copper, aluminum, tantalum, or an alloy thereof. The element area wire 925 may have various shapes for the above-described electric connection.

The terminal area 930 may include the terminal 932 electrically connected to the electronic element 921. The terminal 932 may electrically connect the bezel-free display device 900 to an outside and may transmit electric signals. Also, the terminal area 930 may include the terminal area wire 935. The terminal area wire 935 may electrically connect the terminal 932 and the flexible wire 950. In detail, the terminal area wire 935 may be physically and/or electrically connected to the terminal 932 at an end of the terminal area wire 935 and may be physically and/or electrically connected to the flexible wire 950 at the other end of the terminal area wire 935. The terminal 932 and the terminal area wire 935 may include a material having relatively rigidity compared to the flexible wire 950, for example, metal, such as copper, aluminum, tantalum, or an alloy thereof. The terminal 932 and the terminal area wire 935 may have various shapes for the above-described electric connection.

The element area wire 925, the terminal area wire 935, and the terminal 932 may include the same material or different materials. Also, the element area wire 925, the terminal area wire 935, and the terminal 932 may be simultaneously formed in the same process or may be separately formed in different processes.

The flexible area 940 may be positioned between the element area 920 and the terminal area 930 and may have flexibility. In order for the flexible area 940 to have flexibility, a material used to form the flexible area 940 may have flexibility. For example, the flexible area 940 may include a material having different flexibility from that of materials used to form the element area 920 and the terminal area 930. Also, the flexible area 940 may have a smaller thickness than that of the element area 920 and the terminal area 930. Thus, flexibility can be provided. The element area 920 and the terminal area 930 have rigidity compared to the flexible area 940, and a case where the element area 920 and the terminal area 930 have flexibility or elasticity, is also included in the technical idea of the present invention. A material used to form the flexible substrate 910 and a method of manufacturing the flexible wire 950 will now be described as an example.

The flexible wire 950 may be positioned on the flexible area 940 of the flexible substrate 910 and may have flexibility. Flexibility of the flexible wire 950 may be the same or nearly similar to flexibility of the flexible wire 940 of the flexible substrate 910. Also, the flexible wire 950 may electrically connect the electronic element 921 positioned on the element area 920 of the flexible substrate 910 and the terminal 932 positioned on the terminal area 930 of the flexible substrate 910. In detail, the electronic element 921 may be electrically connected to the terminal 932 through the element area wire 925, the flexible wire 950, and the terminal area wire 935, and furthermore, the display member 990 may be electrically connected to the terminal 932 depending on the electric connection technique. The flexible wire 950 may be the same as or similar to the flexible wires 100 and 200 and the stack type flexible wires 300, 300a, 300b, 300c, 400, and 500 described with reference to FIGS. 1 through 34.

The flexible wire 950 may include a graphene layer and a nanomaterial layer that is positioned to contact the graphene layer, includes nanomaterials that form a network by overlapping each other and has a low sheet resistance than that of the graphene layer.

The flexible wire 950 may have a sheet resistance in the range of 30 to 160Ω/□. The flexible wire 950 may have a resistance change in the range of 0 to 20% with respect to strain in the range of 0 to 100%.

The flexible wire 950 may have the arrangement of FIG. 1. That is, the graphene layer may be positioned on the flexible area 940 of the flexible substrate 910 corresponding to the light-transmitting substrate 110 of FIG. 1, and the nanomaterial layer may be positioned on the graphene layer.

Also, the flexible wire 950 may have the arrangement of FIG. 4. That is, the nanomaterial layer may be positioned on the flexible area 940 of the flexible substrate 910 corresponding to the light-transmitting substrate 210 of FIG. 4, and the graphene layer may be positioned on the nanomaterial layer.

Also, the flexible wire 950 may have the arrangement of FIGS. 21 through 24. For example, the graphene layer may include a plurality of graphene layers, and the nanomaterial layer may include a plurality of nanomaterial layers, and the flexible wire may be configured by stacking the plurality of graphene layers and the plurality of nanomaterial layers alternately.

The nanomaterial layer may include a metal nanomaterial or CNTs. Also, the nanomaterial layer may include at least one of nanowires, nanoparticles, nanorods, nanowalls, nanotubes, nanobelts, and nanorings.

The flexible wire 950 may include Ag nanowires as the nanomaterial layer, and the graphene layer may perform a function of an oxidation prevention layer that prevents oxidation of the Ag nanowires.

A case where the flexible wire 950 is configured of the graphene layer and the nanomaterial layer, is an example, and the technical idea of the present invention is not limited thereto. For example, the flexible wire 950 may include a flexible wire substrate having a metal wire formed on a polymer film. However, in this case, it should be noted that, when the flexible wire 950 is folded, the flexible wire 950 has a material property that the metal wire is not detached from the polymer film.

Figure 39:
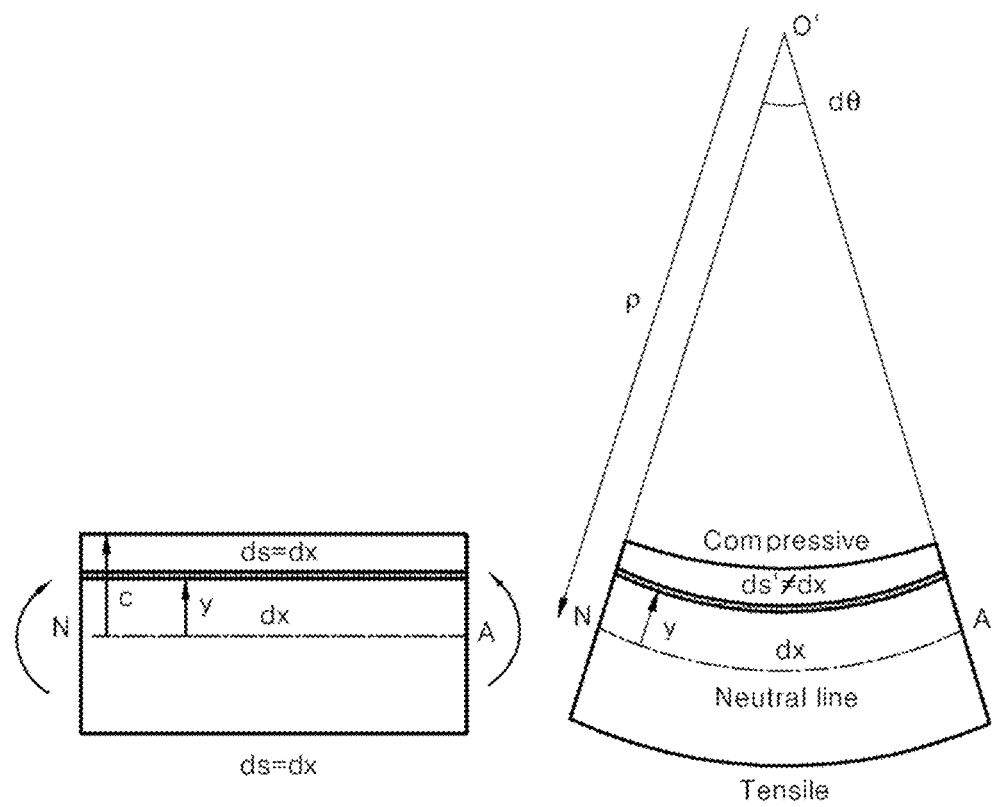
FIG. 39 is a view for describing the principle of a folder of the bezel-free display device according to an embodiment of the present invention.

The display member 990 may be positioned on the element area 920 of the flexible substrate 910. The display member 990 may be electrically and/or physically connected to the electronic element 921 positioned on the element area 920. Also, the display member 990 may be electrically connected to the terminal 932 through the above-described electric connection and thus may be electrically connected to the outside. The display member 990 may be an optical element device, such as an LED or an LD, a display device, such as an LCD or an OLED, or a touch panel device. FIG. 39 is a view for describing the principle of a folder of the bezel-free display device according to an embodiment of the present invention.

Referring to FIG. 39, strain when a medium having a flat plate shape in the left drawing, for example, the flexible area 940 of the flexible substrate 910 is bent and has a shape in the right drawing, is obtained by the following equation:

$$\varepsilon_{max} = -\frac{c}{\rho}.$$

When the medium is the flexible area 940 of the flexible substrate 910, a thickness ρ of the medium is 52 μm and c is 17 μm, maximum strain may be 42.5%. Thus, the flexible area 940 of the flexible substrate 910 may have maximum strain in the range of 0 to about 100%, for example, maximum strain in the range of about 40 to about 100%. Also, the flexible wire 950 positioned on the flexible wire 940 may have maximum strain in the range of 0 to about 100%, for example, maximum strain in the range of about 40 to about 100%. Thus, even when the flexible area 940 is bent, the flexible wire 950 may not be detached from the flexible area 940.

For example, maximum strain of ITO is about 1%, for example, maximum strain of metal, for example, maximum strain of copper is about 1%, whereas strain of PDMS that may be used as a material for the flexible substrate 910 is about 100%. Thus, when the materials are used to form the flexible wire 950, the flexible wire 950 may be detached from the flexible area 940 due to a difference between strain of the flexible wire 950 and stain of the flexible area 940, the flexible wire 950 may be detached from the flexible area 940. On the other hand, maximum strain of the flexible wire 950 including graphene and Ag nanowires is about 100% so that the flexible wire 950 can be prevented from the flexible area 940.

Figure 40:
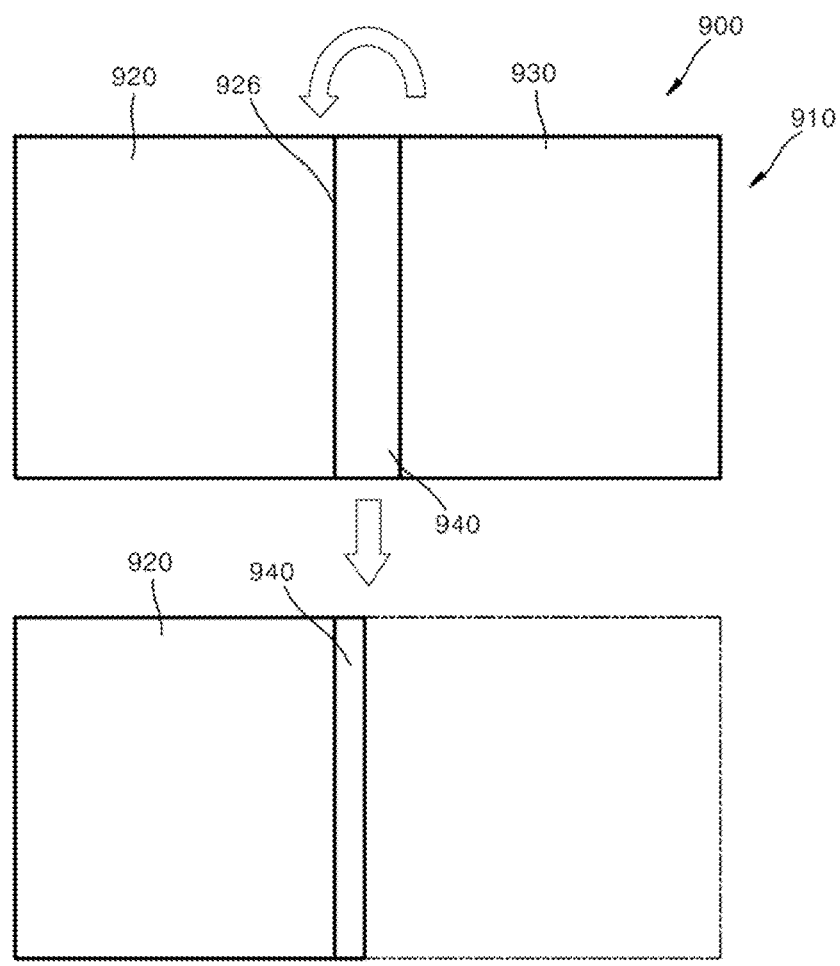
FIG. 40 is a schematic view illustrating an operation of folding the flexible substrate of the bezel-free display device according to an embodiment of the present invention.

FIG. 40 is a schematic view illustrating an operation of folding the flexible substrate of the bezel-free display device 900 according to an embodiment of the present invention. For clear explanation, a part of elements are omitted and shown.

Referring to FIG. 40, the bezel-free display device 900 may have a configuration in which the flexible wire 950 is bent and positioned on one side of the bezel-free display device 900.

The flexible area 940 contacts and is positioned on a first side 926 of the element area 920. The terminal area 930 may be positioned on a rear surface of the element area 920 as the flexible area 940 is folded at the first side 926 of the element area 920. That is, the terminal area 930 is reversely positioned on the element area 920. That is, the display member 990 is positioned on an upper surface of the bezel-free display device 900, and terminal 932 is positioned on a rear surface of the bezel-free display device 900 and is exposed. As a result, bezel of the upper surface can be removed.

The area of the terminal area 930 may be equal to or smaller than the area of the element area 920. The shape of the element area 920 may be a rectangular shape, for example, a rectangle or square. However, shapes of the element area 920 and the terminal area 930 are examples, and the technical idea of the present invention is not limited thereto, and the element area 920 and the terminal area 930 may have various polygonal shapes, such as triangle, a pentagon, and a hexagon, or various circular shapes, such as a circle, an oval, and a semi-circle.

Figure 41:
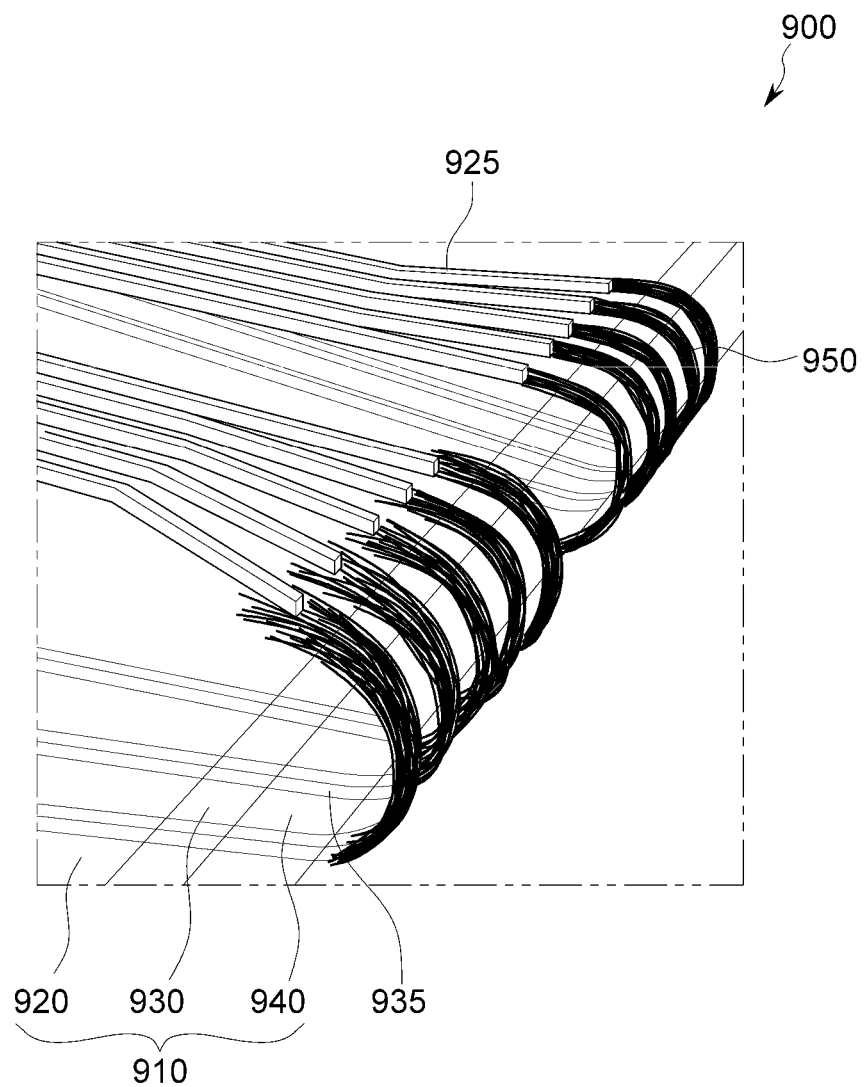
FIG. 41 is a schematic view illustrating a folded state of the flexible wire of the bezel-free display device according to an embodiment of the present invention.

FIG. 41 is a schematic view illustrating a folded state of the flexible wire 950 of the bezel-free display device 900 according to an embodiment of the present invention. For clear explanation, a part of elements is omitted and shown.

Referring to FIG. 41, in the bezel-free display device 900, the element area 920 and the terminal area 930 of the flexible substrate 910 may not be bent, and the flexible area 940 may be bent so that bezel can be formed on the rear surface of the bezel-free display device 900. Thus, an element area wire 925 and a terminal area wire 935 having relatively low flexibility are not bent or are bent at a minimum level not to be detached from the element area 920 and the terminal area 930, respectively, whereas the flexible wire 950 is bent. As described above, the flexible wire 950 has maximum strain of about 100%. Thus, even in this bending, there is no plastic deformation and no resistance change, and a detachment phenomenon of the flexible substrate 910 from the flexile wire 940 may occur hardly.

As described above, the bezel-free display device 900 uses the flexible area 940 and the flexible wire 950 between the element area 920 and the terminal area 930 of the flexible substrate 910 so that a terminal can be disposed on the rear surface of the bezel-free display device 900 and bezel can be minimized or removed. Thus, when a plurality of bezel-free display devices 900 are connected to implement an enlarged screen, dividing of the screen can be minimized. Thus, a larger screen can be continuously reproduced.

Figure 42:
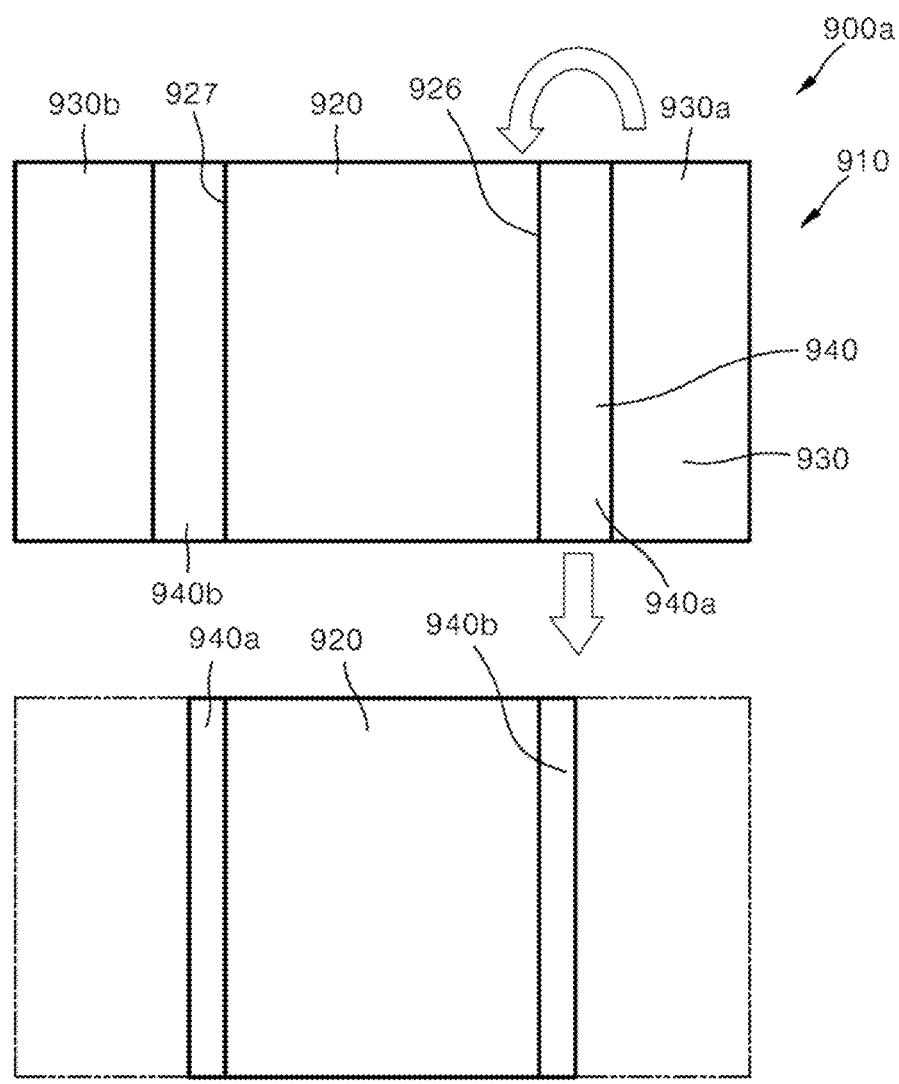
FIGS. 42 through 44 are schematic views illustrating an operation of folding flexible substrates of bezel-free display devices according to an embodiment of the present invention.
Figure 43:
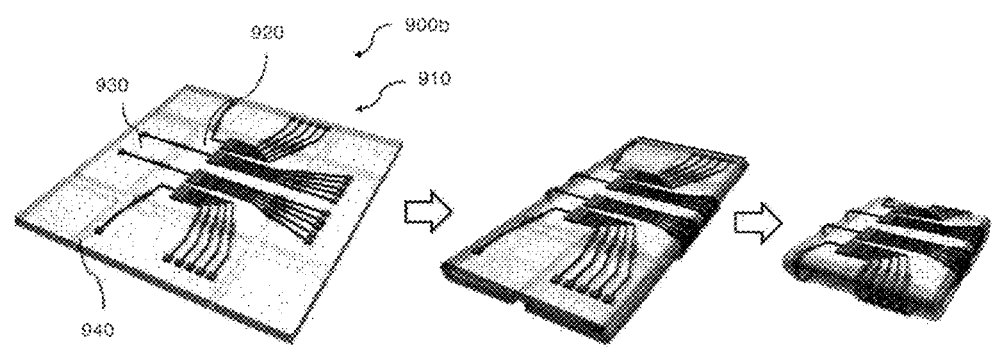
Figure 44:
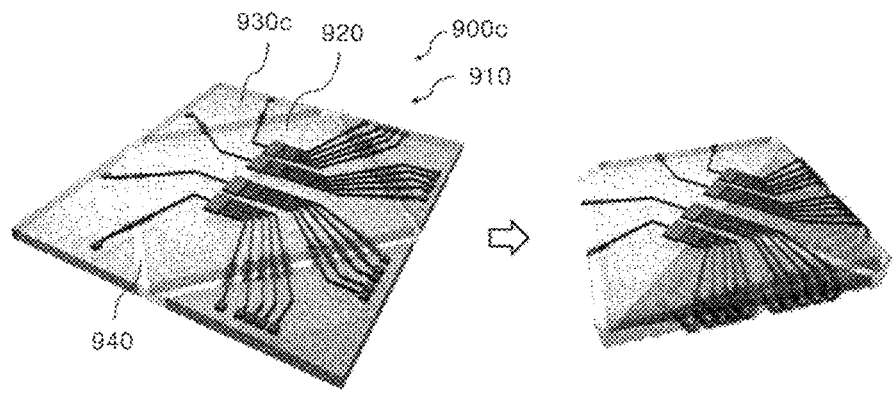

FIGS. 42 through 44 are schematic views illustrating an operation of folding flexible substrates of bezel-free display devices 900a, 900b, and 900c according to an embodiment of the present invention. For clear explanation, a part of elements are omitted and shown.

Referring to FIG. 42, the bezel-free display device 900a may have a configuration in which flexible wires 950 are bent on both opposite sides of the bezel-free display device 900a.

A terminal area 930 may include a plurality of terminal areas, i.e., a first terminal area 930a and a second terminal area 930b. The flexible area 940 may include a plurality of flexible areas, i.e., a first flexible area 940a and a second flexible area 940b.

The plurality of flexible areas 940 may contact and may be positioned on both opposite sides of the element area 920. For example, the first flexible area 940a may contact and may be positioned at a first side 926 of the element area 920, and the second flexible area 940b may contact and may be positioned at a second side 927 that is opposite to the first side 926 of the element area 920.

The plurality of terminal areas 930 may be positioned on both opposite sides of the element area 920 and may contact and may be positioned on the plurality of flexible areas 940. For example, the first terminal area 930a may contact and may be positioned on the first flexible area 940a that contacts the first side 926 of the element area 920, and the second terminal area 930b may contact and may be positioned on the second flexible area 940b that contacts the second side 927 of the element area 920.

Each of the terminal areas 930 may be positioned on the rear surface of the element area 920 as the flexible areas 940 are folded at both sides of the element area 920, respectively. That is, the terminal areas 930 are reversely positioned on the element area 920. In detail, the first terminal area 930a may be positioned on the rear surface of the element area 920 as the first flexible area 940a is folded at the first side 926 of the element area 920. The second terminal area 930b may be positioned on the rear surface of the element area 920 as the second flexible area 940b is folded at the second side 927 of the element area 920.

The area of the first terminal area 930a and the area of the second terminal area 930b may be equal to or different from each other. Also, each of the area of the first terminal area 930a and the area of the second terminal area 930b may be smaller than the area of the element area 920. The sum of the area of the first terminal area 930a and the area of the second terminal area 930b may be equal to or smaller than the area of the element area 920. In this case, the first terminal area 930a and the second terminal area 930b may not overlap each other. On the other hand, a case where the sum of the area of the first terminal area 930a and the area of the second terminal area 930b is larger than the area of the element area 920, is also included in the technical idea of the present invention. In this case, the first terminal area 930a and the second terminal area 930b may overlap each other.

In the embodiment illustrated in FIG. 42, the first terminal area 930a and the second terminal area 930b are positioned on both sides, i.e., left and right sides of the element area 920. However, this is an example, and the technical idea of the present invention is not limited thereto. For example, a case where the first terminal area 930a and the second terminal area 930b are positioned at both sides, i.e., upper and lower sides of the element area 920, is also included in the technical idea of the present invention.

Also, a case where the first terminal area 930a and the second terminal area 930b are positioned on sides that are not both opposite sides of the element area 920, for example, a case where the first terminal area 930a and the second terminal area 930b are positioned on upper and left sides, upper and right sides, lower and left sides or lower and right sides, is also included in the technical idea of the present invention. In this case, the first terminal area 930a and the second terminal area 930b may overlap each other. The area of the flexible substrate 910 before the terminal areas 930 are folded, may be larger than an area formed when the terminal areas 930 are folded, for example, twice.

Referring to FIG. 43, the bezel-free display device 900b may have a configuration in which flexible wires 950 are bent at four sides of the bezel-free display device 900b. The flexible area 940 may include a plurality of flexible areas. The flexible area 940 may be positioned by surrounding an outer edge of the element area 920 of the plurality of flexible areas 940 and may have a cross shape. That is, the element area 920 may be positioned in the center of the flexible areas 940. Thus, the element area 920 may be positioned in the center of the terminal area 930. The flexible areas 940 may extend parallel to edges of the flexible substrate 910.

The terminal area 930 may include a plurality of flexible areas. Each of the terminal areas 930 may be positioned on the rear surface of the element area 920 as the flexible areas 940 are respectively folded. The terminal areas 930 may have a rectangular shape having sides parallel to the edges of the flexible substrate 910. The area of the flexible substrate 910 before the terminal areas 930 are folded, may be larger than an area formed when the terminal areas 930 are folded, for example, four times. Also, the terminal areas 930 may overlap each other.

Referring to FIG. 44, a bezel-free display device 900c may have a configuration in which flexible wires 950 are bent at four sides of the bezel-free display device 900c. The flexible area 940 may includes a plurality of flexible areas. The flexible area 940 may be positioned by surrounding an outer edge of the element area 920 of the plurality of flexible areas 940 and may have a cross shape. That is, the element area 920 may be positioned in the center of the flexible areas 940. Thus, the element area 920 may be positioned in the center of the terminal area 930. The flexible areas 940 may extend to have a constant angle with respect to edges of the flexible substrate 910.

The terminal area 930 may include a plurality of flexible areas. Each of the terminal areas 930 may be positioned on the rear surface of the element area 920 as the flexible areas 940 are respectively folded. Each of the terminal areas 930 may include vertices of the flexible substrate 910 and may have a shape of a triangle having sides contacting the flexible areas 940 as opposite sides of the vertices. The area of the flexible substrate 910 before the terminal areas 930 are folded, may be larger than an area formed when the terminal areas 930 are folded, for example, twice. Also, the terminal areas 930 may not overlap each other.

Figure 45:
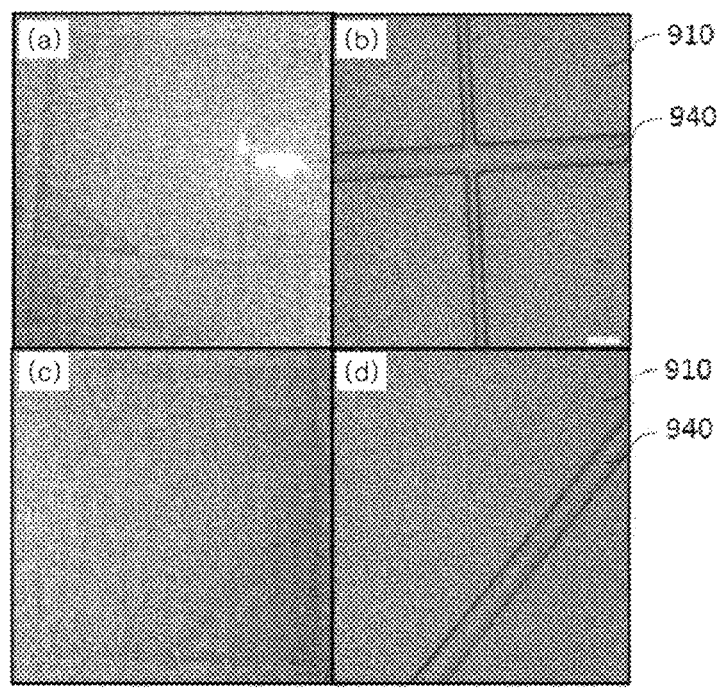
FIG. 45 is photos showing a flexible substrate included in a bezel-free display device according to an embodiment of the present invention.

FIG. 45 is photos showing a flexible substrate 910 included in a bezel-free display device 900 according to an embodiment of the present invention. In the drawings, a photo in which a partial area of (a) is enlarged, is (b), and a photo in which a partial area of (c) is enlarged, is (d).

FIGS. 45(a) and 45(b) illustrate the flexible substrate 910 that may be used in the bezel-free display device 900b illustrated in FIG. 43. A cross-shaped flexible area 940 having flexibility is formed in the flexible substrate. FIGS. 45(c) and 45(d) illustrate the flexible substrate 910 that may be used in the bezel-free display device 900c illustrated in FIG. 44. A cross-shaped flexible area 940 having flexibility is formed in the flexible substrate.

Figure 46:
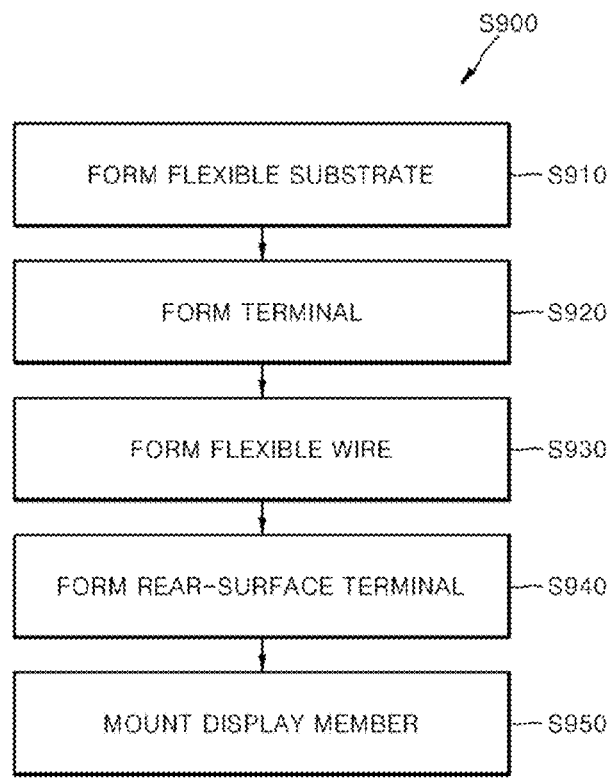
FIG. 46 is a flowchart illustrating a method of manufacturing a bezel-free display device according to an embodiment of the present invention.

FIG. 46 is a flowchart illustrating a method (S900) of manufacturing a bezel-free display device according to an embodiment of the present invention.

Referring to FIG. 46, the method (S900) of manufacturing the bezel-free display device includes forming a flexible substrate (S910) including an element area and a terminal area and a flexible area positioned between the element area and the terminal area and having flexibility; forming an electronic element and an element area wire in the element area and forming a terminal area wire and a terminal in the terminal area (S920); forming a flexible wire (S930) that connects the element area wire and the terminal area wire on the flexible area of the flexible substrate and has flexibility; forming a rear-surface terminal (S940) in such a way that the flexible area is folded and the terminal area is positioned on a rear surface of the element area; and mounting a display member (S950) in such a way that a display member is electrically connected to the electronic element and mounted on the element area.

Hereinafter, reference numerals of the above-described embodiments are used for elements designated to explain the method (S900) of manufacturing the bezel-free display device with reference to the drawings.

Forming of the flexible substrate (S910) may be implemented using various methods. Hereinafter, an embodiment of forming the flexible substrate (S910) will be described as an example.

A glass substrate is prepared, and a PMMA layer is formed on the glass substrate using spin coating. A negative photoresist layer is formed on the PMMA layer using spin coating. In order to increase an adhesion force between the PMMA layer and the negative photoresist layer, a hexamethyldisilazane (HMDS) layer may be further formed between the PMMA layer and the negative photoresist layer. The thickness of the negative photoresist layer may be in the range of about 10 to 100 μm, for example, about 50 μm. The negative photoresist layer is patterned by ultraviolet (UV) exposure so that trenches can be formed.

An uncured flexible material, for example, a PDMS layer is formed on the negative photoresist layer using spin coating. The thickness of the PDMS layer may be in the range of about 10 to 100 μm, for example, about 52 μm. Subsequently, the PDMS layer is annealed and cured. The curing process can be performed at about 115° C. for about 4 hours, for example.

Subsequently, the PMMA layer is melted using a solvent, such as acetone, to remove the glass substrate. Thus, the flexible substrate 910 including the negative photoresist layer and PDMS is formed.

The PDMS layer can be coated on the negative photoresisst layer and can fill the trenches formed in the negative photoresist layer. That is, the PDMS layer may be formed in the negative photoresist layer to have a relatively small thickness and in the trenches to have a relatively large thickness. For example, the PDMS layer in the trenches may have a thickness of about 52 μm, and the PDMS layer in the negative photoresist layer having a thickness of about 50 μm may have a thickness of about 2 μm. The negative photoresist layer that is formed of a relatively rigid material can form the element area 920 and the terminal area 930 of the flexible substrate 910, and the PDMS layer that is formed of a relatively elastic material can form the flexible area 940 of the flexible substrate 910. The flexible substrate 910 can be formed using the above-described method.

In Operation of forming the terminal (S920), the element area wire 925 and the electronic element 921 are formed in the element area 920 of the flexible substrate 910, and the terminal 932 and the terminal area wire 935 are formed on the terminal area 930. The electronic element 921 can be formed using a well-known method in the field of a semiconductor or display. The element area wire 925, the terminal 932, and the terminal area wire 935 can be simultaneously formed by performing the same process using the same material or can be individually formed by performing different processes using different materials. The element area wire 925, the terminal 932, and the terminal area wire 935 can be formed using a well-known method in the field of the semiconductor or display, such as deposition, lithography, lift-off.

Hereinafter, an embodiment of Operation of forming the terminal (S920) will be described as an example.

A positive photoresist layer is formed on the flexible substrate 910 provided by the above method by using spin coating and is patterned. Metal materials to be used to form the element area wire 925, the terminal 932, and the terminal area wire 935, for example, Cr and Cu, are formed on the positive photoresist layer to have a thickness of about 2 nm and about 100 nm, respectively, using various deposition methods. Subsequently, the positive photoresist layer is removed using a lift-off technique so that the element area wire 925, the terminal 932 and the terminal area wire 935 can be formed.

In Operation of forming the flexible wire (S930) can be implemented using the manufacturing method described with reference to FIGS. 5 and 6. For example, Operation of forming the flexible wire (S930) may include providing a substrate, forming the graphene layer on the substrate using a transfer technique, and forming a nanomaterial layer having a lower sheet resistance than that of the graphene layer to contact the graphene layer and to be positioned on the light-transmitting substrate by spin-coating a solution including nanomaterials on the substrate and forming a network by overlapping the nanomaterials.

Hereinafter, an embodiment of Operation of forming the flexible wire (S930) will be described as an example.

Reactive ion etching is performed in the flexible area 940 of the flexible substrate 910 so that spin coating of the nanomaterial layer can be facilitated in a subsequently process. Subsequently, the nanomaterial layer is formed on the flexible area 940 of the flexible substrate 910 by using spin coating. The nanomaterial layer may include Ag nanowires. The graphene layer is formed on the nanomaterial layer using a transfer technique. Operations of forming the nanomaterial layer and the graphene layer can be reversely performed.

The nanomaterial layer and the graphene layer are formed on the flexible area 940 of the flexible substrate 910 and thus need to be patterned. Thus, a positive photoresist layer is formed on the nanomaterial layer and the graphene layer by using spin coating and is patterned to have a desired wire shape. Subsequently, the nanomaterial layer and the graphene layer are dry-etched by reactive ion etching, and the positive photoresist layer is removed so that the flexible wire 950 can be formed. Also, the channel area 924 of the electronic element 921 positioned on the element area 920 can be simultaneously formed in the same process as that of the flexible wire 950.

Also, the nanomaterial layer and the graphene layer can extend to be formed on the element area 920 and the terminal area 930 of the flexible substrate 910. Thus, the nanomaterial layer and the graphene layer can be physically and/or electrically connected to the element area wire 925 and the terminal area wire 935, respectively.

A bezel-free display device according to the technical idea of the present invention may include: a substrate including a first area, a second area reversely positioned on the first area, and a third area positioned between the first area and the second area and having flexibility; a first wire mounted on the first area; a second wire formed on the second area; and a flexible wire that is positioned on the third area, electrically connects the first wire and the second wire and has flexibility. The first area, the second area, and the third area may correspond to the above-described element area 920, terminal area 930, and flexible area 940, respectively. The first wire may correspond to the electronic element 921 and/or the element area wire 925 formed in the element area 920. The second wire may correspond to the terminal 932 formed in the terminal area 930/or the terminal area wire 935.

Figure 47:
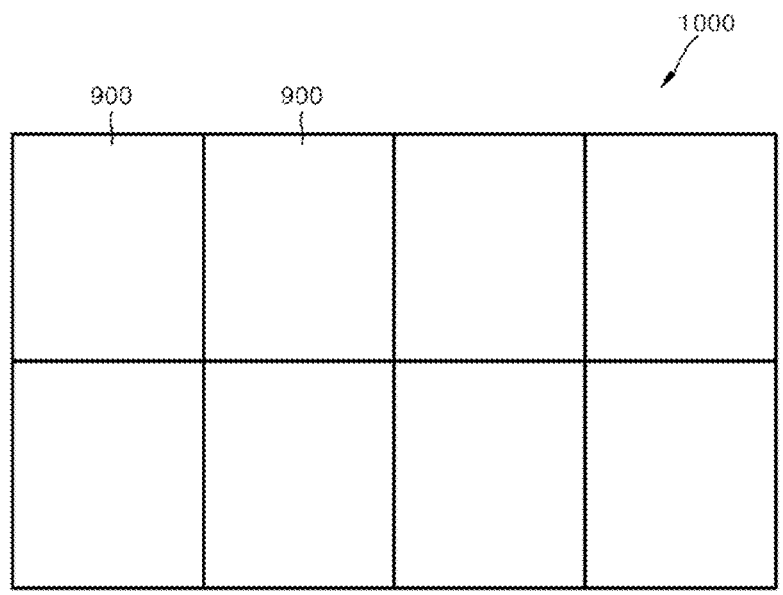
FIG. 47 is a plan view of an expanded display device formed by combing bezel-free display devices according to an embodiment of the present invention.

FIG. 47 is a plan view of an expanded display device 1000 formed by combing bezel-free display devices 900 according to an embodiment of the present invention.

Referring to FIG. 47, the expanded display device 1000 may include a plurality of bezel-free display devices 900. The plurality of bezel-free display devices 900 may be coupled to each other in upward, downward, left, and right directions. Thus, an expanded screen can be provided. Since a terminal is formed on a rear surface of the bezel-free display device 900, bezel can be removed from a display surface of the bezel-free display device 900. Thus, the bezel-free display device 900 can implement continuity of provided screens.

Figure 48:
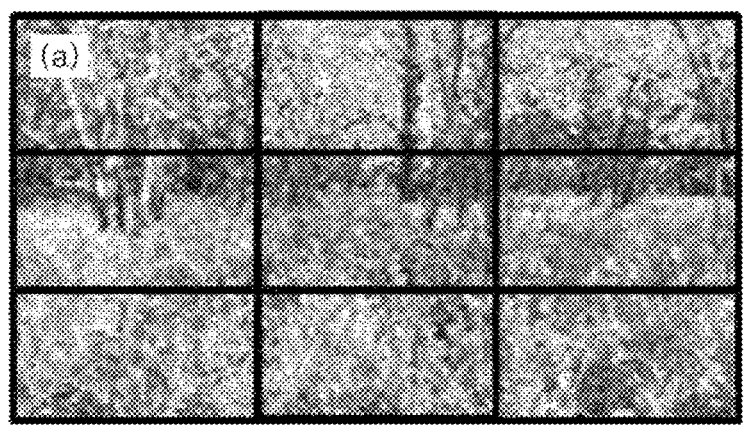
FIG. 48 is a schematic view comparing a screen implemented by a bezel-free display device according to an embodiment of the present invention with a screen implemented by a display device according to the related art.
Figure 48:
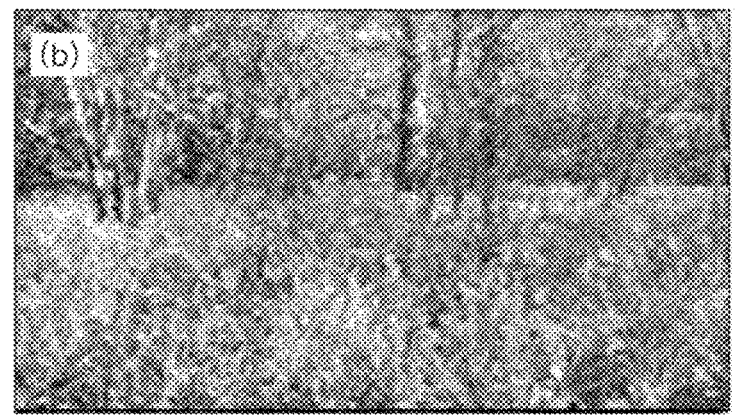

FIG. 48 is a schematic view comparing a screen implemented by a bezel-free display device 900 according to an embodiment of the present invention with a screen implemented by a display device according to the related art.

Referring to FIG. 48, as illustrated in (a), the display device according to the related art includes bezel formed on a display surface indicated by a black line. Thus, a screen is spitted by the bezel and is discontinuously shown, and readability of the screen is lowered. On the other hand, as illustrated in (b), the bezel-free display device 900 according to the technical idea of the present invention can remove bezel so that the above-described screen splitting phenomenon by bezel can be prevented. Thus, a continuous screen can be provided, and readability and an aesthetic appealing effect can be remarkably increased. Also, when a large screen is implemented, a comparable effect to a case where a large display device is used, can be attained by using a display device having a relatively small size in place of a large display device that is economically infeasible and uncomfortable handling.

INDUSTRIAL APPLICABILITY

By using the present invention, a bezel-free display device that removes a bezel area can be provided.

The invention claimed is:

1. A bezel-free display device comprising:
   a flexible substrate comprising an element area including an electronic element and positioned on the upper surface thereof, a terminal area including a terminal electrically connected to the electronic element, and positioned at the rear surface thereof, and a flexible area positioned between the element area and the terminal area and having flexibility;
   a flexible wire positioned on the flexible area of the flexible substrate, electrically connecting the element and the terminal, and having flexibility; and
   a display member positioned on the element area of the flexible substrate and electrically connected with the electronic element,
   wherein the flexible wire comprises:

a two-dimensional (2D) nanomaterial layer including 2D nanomaterials; and
a one-dimensional nanomaterial layer positioned to contact the 2D nanomaterial layer, including one-dimensional nanomaterials that form a network by overlapping each other and having a lower sheet resistance than that of the 2D nanomaterial layer, and
wherein the 2D nanomaterial layer is positioned on the flexible area of the flexible substrate, and the one-dimensional nanomaterial layer is positioned on the 2D nanomaterial layer.

2. The bezel-free display device of claim 1, wherein the flexible wire has maximum strain in a range of 40 to 100%.

3. The bezel-free display device of claim 1, wherein the flexible wire has a sheet resistance in a range of 30 to 160 Ω/□.

4. The bezel-free display device of claim 1, wherein the flexible wire has a resistance change in a range of 0 to 20% with respect to strain in a range of 0 to 100%.

5. A bezel-free display device comprising:
a flexible substrate comprising an element area including an electronic element and positioned on the upper surface thereof, a terminal area including a terminal electrically connected to the electronic element, and positioned at the rear surface thereof, and a flexible area positioned between the element area and the terminal area and having flexibility;
a flexible wire positioned on the flexible area of the flexible substrate, electrically connecting the element and the terminal, and having flexibility; and
a display member positioned on the element area of the flexible substrate and electrically connected with the electronic element,
wherein the flexible wire comprises:
a two-dimensional (2D) nanomaterial layer including 2D nanomaterials; and
a one-dimensional nanomaterial layer positioned to contact the 2D nanomaterial layer, including one-dimensional nanomaterials that form a network by overlapping each other and having a lower sheet resistance than that of the 2D nanomaterial layer,
wherein the one-dimensional nanomaterial layer is positioned on the flexible area of the flexible substrate, and the 2D nanomaterial layer is positioned on the one-dimensional nanomaterial layer.

6. The bezel-free display device of claim 1, wherein the 2D nanomaterial layer comprises graphene, graphite or carbon nanotubes (CNTs).

7. The bezel-free display device of claim 1, wherein the one-dimensional nanomaterial layer comprises metal nanomaterials or CNTs.

8. The bezel-free display device of claim 1, wherein the one-dimensional nanomaterial layer comprises at least one of nanowires, nanoparticles, nanorods, nanowalls, nanotubes, nanobelts, and nanorings.

9. A bezel-free display device comprising:
a flexible substrate comprising an element area including an electronic element and positioned on the upper surface thereof, a terminal area including a terminal electrically connected to the electronic element, and positioned at the rear surface thereof, and a flexible area positioned between the element area and the terminal area and having flexibility;
a flexible wire positioned on the flexible area of the flexible substrate, electrically connecting the element and the terminal, and having flexibility; and
a display member positioned on the element area of the flexible substrate and electrically connected with the electronic element,
wherein the flexible wire comprises:
a two-dimensional (2D) nanomaterial layer including 2D nanomaterials; and
a one-dimensional nanomaterial layer positioned to contact the 2D nanomaterial layer, including one-dimensional nanomaterials that form a network by overlapping each other and having a lower sheet resistance than that of the 2D nanomaterial layer,
wherein the 2D nanomaterial layer comprises a plurality of 2D nanomaterial layers, and the one-dimensional nanomaterial layer comprises a plurality of one-dimensional nanomaterial layers, and the flexible wire is configured by stacking the plurality of 2D nanomaterial layers and the plurality of one-dimensional nanomaterial layers alternately.

10. The bezel-free display device of claim 1, wherein the flexible area is positioned at a first side of the element area, and the terminal area is positioned on a rear surface of the element area as the flexible area is folded at the first side of the element area.

11. The bezel-free display device of claim 1, wherein the flexible area comprises a plurality of flexible areas, and the terminal area comprises a plurality of terminal areas.

12. The bezel-free display device of claim 11, wherein the plurality of flexible areas contact and are positioned on both opposite sides of the element area, and each of the terminal areas is positioned on the rear surface of the element area as the flexible areas are respectively folded at both sides of the element area.

13. The bezel-free display device of claim 11, wherein the plurality of flexible areas are positioned by surrounding an outer edge of the element area, and each of the terminal areas is positioned on the rear surface of the element area as the flexible areas positioned by surround the outer edge of the element area are respectively positioned.

14. The bezel-free display device of claim 13, wherein the terminal area has a shape of a rectangle having sides parallel to edges of the flexible substrate or a shape of a triangle including vertices of the flexible substrate.

15. The bezel-free display device of claim 1, wherein an area of the terminal area is smaller than or equal to an area of the element area.

16. The bezel-free display device of claim 1, wherein the element area comprises an element area wire that electrically connects the electronic element and the flexible wire and has rigidity, and the terminal area comprises a terminal and a terminal area wire that electrically connects the terminal and the flexible wire and has rigidity.

17. The bezel-free display device of claim 1, wherein the electronic element has a channel area including the same material as a material used to form the flexible wire.

* * * * *